US008629814B2

(12) United States Patent
Teng et al.

(10) Patent No.: US 8,629,814 B2
(45) Date of Patent: Jan. 14, 2014

(54) CONTROLLING COMPLEMENTARY BISTABLE AND REFRESH-BASED DISPLAYS

(75) Inventors: Albert Teng, Cupertino, CA (US); Jack Yuan, Cupertino, CA (US); Richard Li, Shanghai (CN)

(73) Assignee: Quickbiz Holdings Limited, Apia (WS)

(*) Notice: Subject to any disclaimer, the term of this patent is extended or adjusted under 35 U.S.C. 154(b) by 0 days.

(21) Appl. No.: 12/910,723

(22) Filed: Oct. 22, 2010

(65) Prior Publication Data

US 2011/0260948 A1 Oct. 27, 2011

Related U.S. Application Data

(63) Continuation-in-part of application No. 11/702,788, filed on Feb. 5, 2007, now Pat. No. 7,973,738, which is a continuation-in-part of application No. 11/602,539, filed on Nov. 20, 2006, now Pat. No. 7,742,012.

(60) Provisional application No. 61/254,079, filed on Oct. 22, 2009, provisional application No. 60/850,013, filed on Oct. 6, 2006, provisional application No. 60/848,538, filed on Sep. 29, 2006, provisional application No. 60/844,979, filed on Sep. 14, 2006.

(51) Int. Cl.
*G09G 5/00* (2006.01)
(52) U.S. Cl.
USPC .......................................................... 345/1.3
(58) Field of Classification Search
USPC .................................................... 345/1.1–1.3
See application file for complete search history.

(56) References Cited

U.S. PATENT DOCUMENTS

| 5,488,572 A | 1/1996 | Belmont |
| 5,493,335 A | 2/1996 | Parulski et al. |
| 5,847,698 A | 12/1998 | Reavey et al. |
| 6,336,161 B1 | 1/2002 | Watts |
| 6,353,700 B1 | 3/2002 | Zhou |
| 6,512,497 B1 * | 1/2003 | Kondo et al. .................. 345/1.1 |
| 6,628,244 B1 | 9/2003 | Hirosawa et al. |
| 6,931,265 B2 | 8/2005 | Reyes et al. |
| 7,581,034 B2 | 8/2009 | Polivy et al. |

(Continued)

FOREIGN PATENT DOCUMENTS

EP 1205824 A2 5/2002

OTHER PUBLICATIONS

Chinese First Office Action, Chinese Application No. 200780034341.9, Mar. 31, 2011, 21 pages.

(Continued)

*Primary Examiner* — Jonathan Boyd
(74) *Attorney, Agent, or Firm* — Fenwick & West LLP

(57) ABSTRACT

An electronic device includes complementary dual displays, which enable sending a video signal to a first display, wherein the first display is a refresh-based, high frame rate display; displaying the video signal on the first display; and printing a frame of the video signal to a second display, wherein the second display is a bistable, low frame rate display, the printing including, loading a portion of a current frame of the video signal into a frame buffer, and displaying the current frame of the video signal to a second display, such that a bistable static image is displayed on the second display. The device may be switched among read, extend, and navigate modes, which enable different transitions of content between the two screens by a common application, such as a browser application.

18 Claims, 17 Drawing Sheets

NAVIGATE MODE

(56) References Cited

U.S. PATENT DOCUMENTS

| | | |
|---|---|---|
| 7,631,267 B2 | 12/2009 | Viji et al. |
| 7,634,780 B2 | 12/2009 | Rhoten et al. |
| 7,711,868 B2 | 5/2010 | Rhoten et al. |
| 7,748,634 B1 | 7/2010 | Zehr et al. |
| 7,784,065 B2 | 8/2010 | Polivy et al. |
| 2002/0067319 A1 | 6/2002 | Hensel |
| 2002/0126133 A1 | 9/2002 | Ewins |
| 2002/0149541 A1 | 10/2002 | Shin |
| 2002/0158812 A1 | 10/2002 | Pallakoff |
| 2003/0011534 A1 | 1/2003 | Rengan et al. |
| 2003/0160771 A1 | 8/2003 | Fraser et al. |
| 2004/0190080 A1 | 9/2004 | Kodama et al. |
| 2004/0196210 A1* | 10/2004 | Nagatsuka et al. ............ 345/1.1 |
| 2004/0225613 A1 | 11/2004 | Narayanaswami et al. |
| 2004/0257367 A1 | 12/2004 | Smith et al. |
| 2005/0225556 A1 | 10/2005 | Booth |
| 2006/0017659 A1 | 1/2006 | Ogawa et al. |
| 2006/0050090 A1 | 3/2006 | Ahmed et al. |
| 2006/0077127 A1 | 4/2006 | Sampsell et al. |
| 2006/0083194 A1* | 4/2006 | Dhrimaj et al. ............... 370/328 |
| 2006/0146056 A1 | 7/2006 | Wyatt |
| 2006/0161977 A1 | 7/2006 | Jung et al. |
| 2006/0164324 A1 | 7/2006 | Polivy et al. |
| 2006/0176271 A1 | 8/2006 | Polivy et al. |
| 2006/0187142 A1 | 8/2006 | Lesniak |
| 2006/0197724 A1 | 9/2006 | Sakai |
| 2006/0227141 A1* | 10/2006 | Hogle ........................... 345/473 |
| 2006/0242590 A1 | 10/2006 | Polivy et al. |
| 2007/0046562 A1 | 3/2007 | Polivy et al. |
| 2007/0052615 A1 | 3/2007 | Van Dongen et al. |
| 2007/0118671 A1 | 5/2007 | Ganti |
| 2007/0174918 A1 | 7/2007 | Hirose et al. |
| 2007/0182663 A1* | 8/2007 | Biech ............................ 345/1.1 |
| 2007/0242061 A1 | 10/2007 | Rhoten et al. |
| 2008/0033996 A1 | 2/2008 | Kesari |
| 2008/0080010 A1 | 4/2008 | Korst |
| 2010/0321275 A1* | 12/2010 | Hinckley et al. ............... 345/1.3 |

OTHER PUBLICATIONS

PCT International Search Report and Written Opinion, PCT Application No. PCT/US2007/078208, Mar. 25, 2008, 14 pages.

PCT International Search Report and Written Opinion, PCT Application No. PCT/US2007/078209, Mar. 25, 2008, 8 pages.

* cited by examiner

EXTEND MODE

NAVIGATE MODE

CONTROLLING COMPLEMENTARY BISTABLE AND REFRESH-BASED DISPLAYS

CROSS REFERENCE TO RELATED APPLICATIONS

This application claims the benefit of U.S. Provisional Application No. 61/254,079, filed Oct. 22, 2009; this application is also a continuation-in-part of U.S. application Ser. No. 11/702,788, filed Feb. 5, 2007 which is a continuation-in-part of U.S. application Ser. No. 11/602,539, filed Nov. 20, 2006, now U.S. Pat. No. 7,742,012 which claims the benefit of U.S. Provisional Application No. 60/850,013, filed Oct. 6, 2006, U.S. Provisional Application No. 60/848,538, filed Sep. 29, 2006, and U.S. Provisional Application No. 60/844,979, filed Sep. 14, 2006. Each of the foregoing applications is incorporated by reference in its entirety.

BACKGROUND

LCD-based electronic devices such as Ultra Mobile PC (UMPC), laptops/PCs, personal digital assistants (PDAs), cellular phones, portable digital media players, and the like are becoming ubiquitous in modern technological societies. These devices offer specialized functionality in form factors small enough to carry in a pocket or some other small carrying bag. At least one reason why these types of devices are so popular is because display technology, which provides a convenient user interface, has advanced to a point where relatively small form factors are efficient and inexpensive. Indeed, even the most inexpensive portable electronic devices now include high frame rate color displays. However, conventional displays are not without some disadvantages.

Typically, a PDA may include a refresh-based, high frequency (REHF) display for displaying user selected information. One example of an REHF display is a liquid crystal display (LCD). LCDs have many desirable characteristics including high frame rates which provide for a satisfying visual experience when rapidly switching between screens or when scrolling across a screen. However, typical displays having high screen refresh rates may suffer from poor readability because backlights, which are required in those displays, may be adversely affected by ambient lighting conditions. Eye strain is commonly reported by users and has been documented in some medical literature. Users of UMPCs or PDAs are familiar with the poor readability of LCDs under bright light or direct sunlight. In some examples, shading the screen or moving to a darker environment may be necessary to read an LCD. In another embodiment, the REHF display comprises a mirasol display, which uses micro-electro-mechanical systems (MEMS) drive IMOD reflective technology, such as that provided by Qualcomm.

In order to overcome the shortcomings of an LCD, bistable, low frequency (BILF) displays may be utilized instead of an LCD. One example of a BILF display is and electronic paper display (EPD). EPDs utilize a material called electronic ink and are commercially available under the trade name E INK®. In another embodiment, the BILF display comprises a mirasol display, which uses micro-electro-mechanical systems (MEMS) drive IMOD reflective technology, such as that provided by Qualcomm. EPDs are ideally suited for flexible display applications due to their thin form factor and inherent flexibility. EPDs provide an image stable reflective display technology that uses ultra-low power but is easily read under any lighting condition including direct sunlight. In addition, EPDs provide a bistable display and unlike LCDs, an image on an EPD looks the same from all viewing angles. Further, EPDs will not distort when touched or flexed, making EPDs the ideal display medium for flexible displays and portable devices. EPDs however, cannot, in many examples, completely replace LCDs. At least one reason is because EPDs typically have a low frame rate. As noted above, conventional LCDs are typically configured with high frame rates, which may serve to enhance a user's viewing experience especially when rapidly scrolling through multiple displays. In addition, using a mouse requires high frame rates so that the mouse pointer appears to have smooth movement across a screen. Furthermore, currently, a majority of reading content is created for viewing with an REHL display application such as an LCD application while few applications are written for BILF displays such as an EPD. This trend is likely to continue. It may, therefore, be advantageous to easily display the output of existing REHF display applications on BILF displays such as an EPD.

It may, therefore, be desirable to provide a complementary display to conventional portable electronic device or desktop PC displays which provide a highly readable display that overcomes harsh ambient light conditions, reduces eye strains and does not overly diminish battery life. The method and the heterogeneous display hardware design can deliver many new classes of EPD usage models, including: (1) the capability to extend (or migrate) an REHF-based application to a BILF display for better reading experience where a user may also browse the pages on BILF display without changing the application (in this example, a BILF display could be tightly integrated with an REHF display through system bus or loosely linked through an external device); and (2) the ability to create dual-display aware applications that can take advantages of the unique benefits of both BILF and REHF displays at the same time. These methods can enable extreme ease-of-use involving two heterogeneous displays without traditional "file synch" model that requires multiple steps of selecting files, transfer files and then opening files and then browsing to the desired page. As such, methods for controlling complementary bistable and refresh-based displays are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Therefore, methods for controlling complementary dual displays for use with an electronic device are presented including: sending a video signal to a first display, wherein the first display is a refresh-based, high frame rate display; displaying the video signal on the first display; and printing a frame of the video signal to a second display, wherein the second display is a bistable, low frame rate display, the printing including, loading a portion of a current frame of the video signal into a frame buffer, and displaying the current frame of the video signal to a second display, such that a high resolution static image is displayed on the second display. In some embodiments, methods further include: loading a zoom buffer, the zoom buffer populated with a number of enlarged zoom frames and a number of reduced zoom frames based on the current frame; and selecting a zoom frame for display on the second display. In some embodiments, methods further include: on a pan command for the second display, determining whether a displayed frame is the zoom frame displayed on the second display that is one of the number of enlarged zoom frames; if the displayed frame is the zoom frame displayed on the second display that is one of the number of enlarged zoom frames, displaying the zoom frame that corresponds with the pan command, else selecting a panned page from the first display and printing the panned page on the second display. In some embodiments, methods further include: loading a composite buffer with a composite frame, the composite frame representing a composite image of at least two frames stored in the frame buffer.

In other embodiments, methods for controlling complementary dual displays for use with an electronic device are presented including: sending a first video signal to a first display wherein the first display is a refresh-based high frame rate display; displaying the first video signal on the first display; sending a second video signal to a second display wherein the second display is a bistable low frame rate display; and displaying the second video signal on the second display at the low frame rate. In some embodiments, the second video signal is sent over a wireless connection to an external second display with a reading card and the reading card can send page up/down commands back to read the content from the application resided at the device of the first display. In some embodiments, methods further include: on a clean command for the second display, refreshing a current frame such that artifacts are reduced. In some embodiments, on a wipe command for the second display, wiping the second display such that the second display is blank. In some embodiments, the second video signal includes status information, wherein the status information is selected from the group consisting of: power information, network connection information, signal strength information, user configuration information, display wakefulness information, date information, time information, application information, and system information.

BRIEF DESCRIPTION OF THE DRAWINGS

The present invention is illustrated by way of example, and not by way of limitation, in the figures of the accompanying drawings and in which like reference numerals refer to similar elements and in which.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
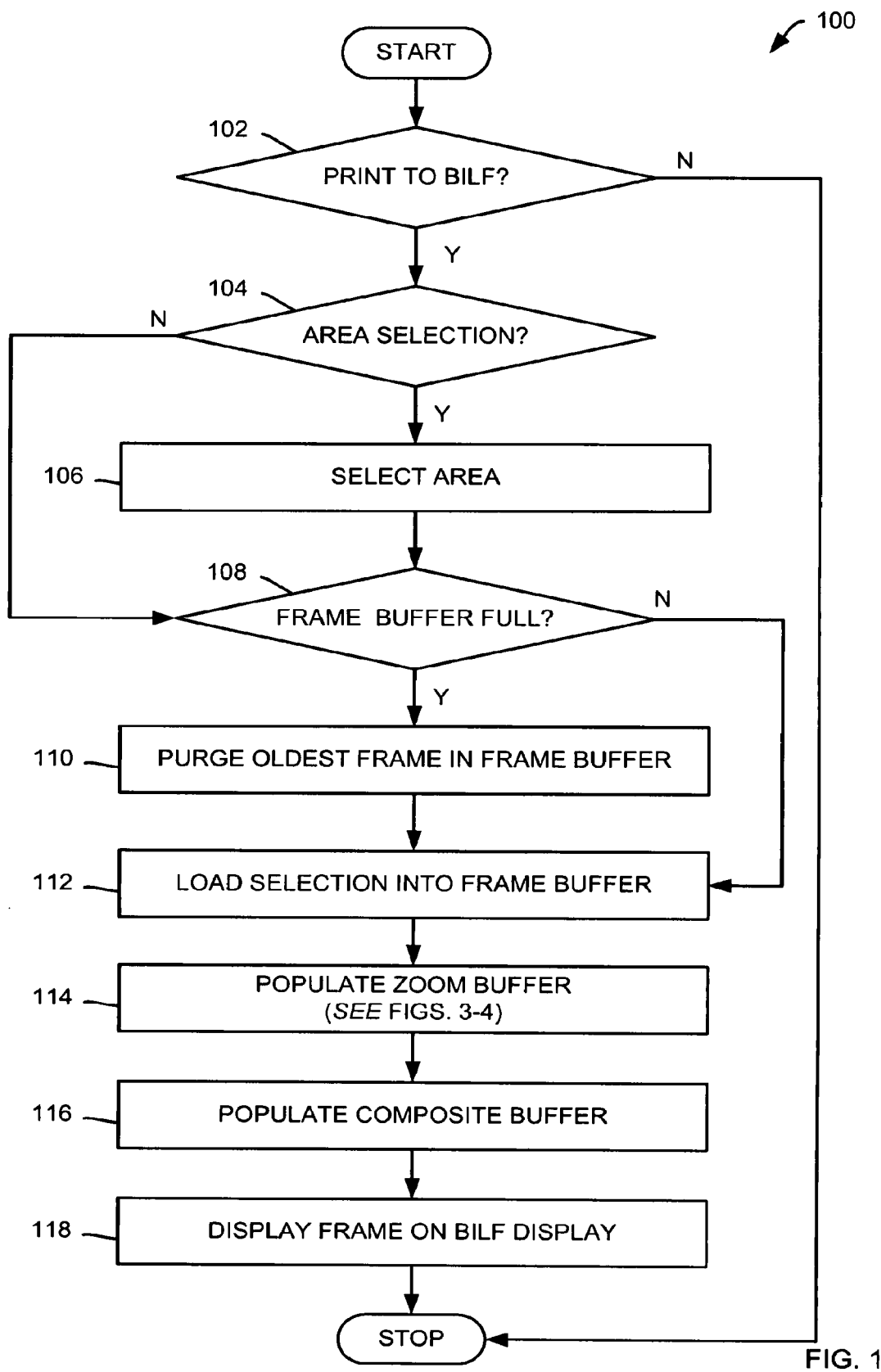
FIG. 1 is an illustrative flowchart for printing to a bistable, low frequency (BILF) display in accordance with embodiments of the present invention.

FIG. 1 is an illustrative flowchart 100 for printing to a bistable, low frequency (BILF) display in accordance with embodiments of the present invention. At a first step 102, the method determines whether printing to a BILF display is requested. Typically, in a dual display system, an REHF display (i.e. LCD) is utilized to navigate a user interface. As noted above, high frame rates provide for a satisfying visual experience when rapidly navigating between screens or when scrolling across a screen whereas low frame rates may not provide as satisfying an experience. Thus, the method contemplates that, as an initial condition, an REHF display is in use when printing to a BILF display is requested. If printing is not requested at a step 102, the method ends. If printing is requested at a step 102, the method continues to a step 104 to determine whether an area selection is desired. As may be appreciated, a user may desire to print only a portion of a currently displayed image on a REHF display. As such, in some embodiments, a user may select a portion of a displayed image for printing to a BILF display. If an area selection is desired at a step 104, the method continues to a step 106 to select an area for printing whereupon the method continues to a step 108. If an area selection is not desired at a step 104, the method continues to a step 108 to determine whether a frame buffer is full.

In some embodiments, a frame buffer may be utilized to store currently printed and previously printed frames. Frame buffers are generally well-known in the art and may be utilized without limitation without departing from the present invention. In one embodiment, the frame buffer is configured to store at least four frames, more preferably 5 to 10 frames, still more preferably greater than 10 frames. A frame represents a bistable static image. It may be appreciated that the number of frames stored is largely a function of memory capacity. That is, in some embodiments, many more frames may be stored without departing from the present invention. If the method determines, at a step 108, that the frame buffer is full, then the oldest frame in the frame buffer is purged at a step 110. Thus, in some embodiments, frame buffers may be configured as first in first out (FIFO) buffers. The method then continues to a step 112. If the method determines, at a step 108, that the frame buffer is not full, then the method continues to a step 112 to load the selection or image into the frame buffer. The method then populates a zoom buffer at a step 114. Zoom buffers will be discussed in further detail below for FIGS. 3-4 below.

The method continues, at a step 116, to populate a composite buffer. A composite buffer may be utilized to provide a user with an indication of what resides in a frame buffer. An image representing a composite image of at least the last two frames stored in the frame buffer may be loaded into a composite buffer. Each time a new image is selected for printing to a BILF display, a new composite image may be loaded into the composite buffer. Furthermore, as may be appreciated, if a frame buffer contains more than four images, more images may be utilized to populate a composite buffer with other composite images in some embodiments. Thus, a part of, or all of a frame buffer may be represented with composite images without departing from the present invention.

After the method populates a composite buffer at a step 116, the method continues, at a step 118, to display the frame that was loaded into the frame buffer at a step 112. The method then ends. It may be appreciated that printing to a BILF display as contemplated by flowchart 100 results in a high static image displayed on the BILF display that was previously displayed and continues to be displayed on an REHF display. A user may then navigate on the REHF display while maintaining a bistable static image on the BILF display. In some embodiments, a user may wish to migrate an application between a BILF display and an REHF display. Thus, migration may provide for switching either the entire screen or the application focus between the BILF and REHF.

Figure 2:
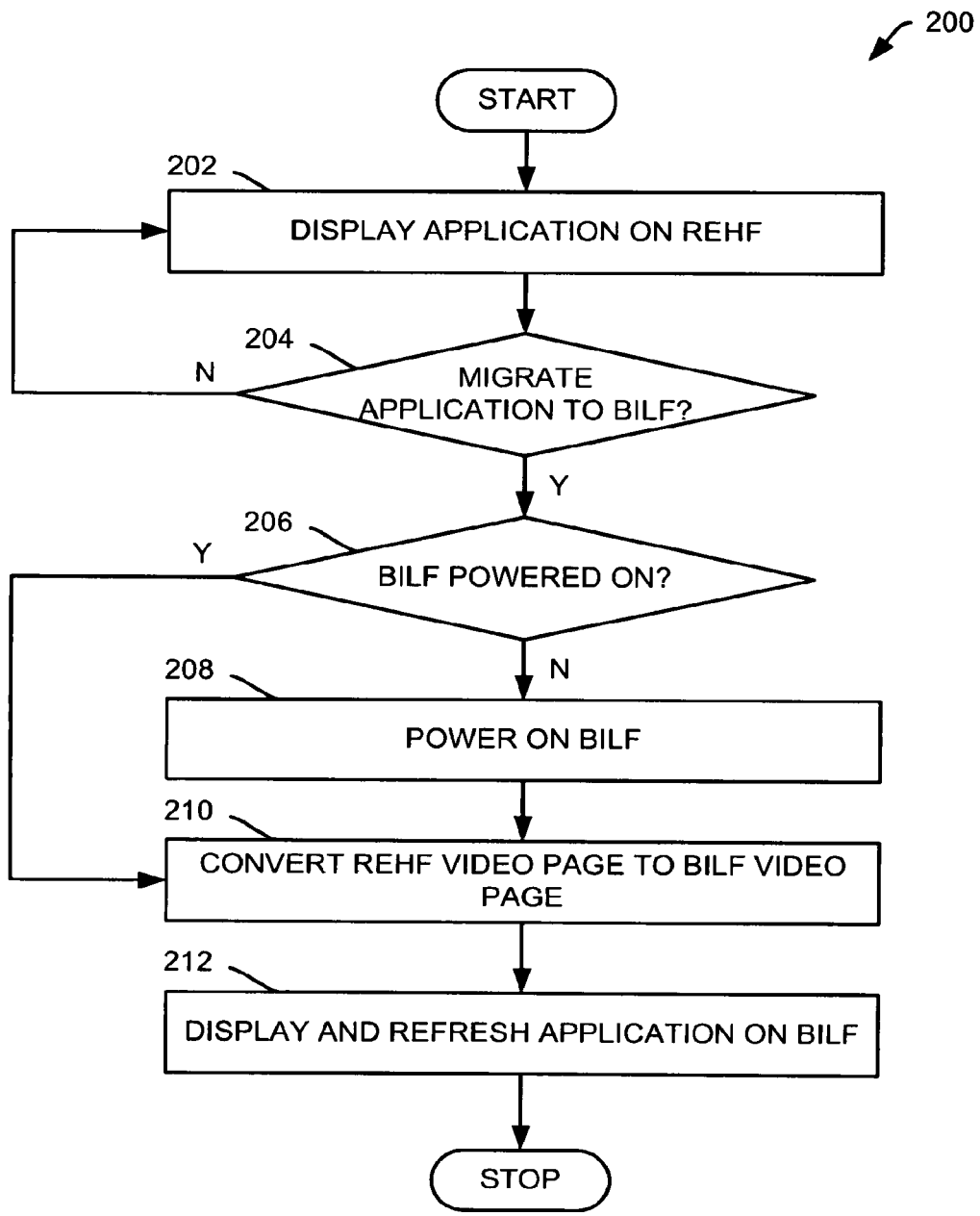
FIG. 2 is an illustrative flowchart for migrating a display between a BILF and a REHF display in accordance with embodiments of the present invention.

FIG. 2 is an illustrative flowchart 200 for migrating a display between a BILF display and a REHF display in accordance with embodiments of the present invention. At a first step 202, an application is being displayed on an REHF display. At a next step 204, the method determines whether migrating an application to a BILF display is required. Thus, although typically, a user may prefer to navigate an application over a REHF display, there may be instances where it is desirable to navigate an application over a BILF display, such as with a reading application for example. The migration of an REHF-based application to a bistable display tends to enhance reading experience and provides a user with a capability to browse reading pages on the bistable display after the migration. If the method determines, at a step 204, that a migration is not required, the method continues to a step 202 to continue displaying the application on an REHF display. If the method determines, at a step 204, that a migration is required, the method determines whether a BILF display is powered on. If method determines that the BILF display is not powered on at a step 206, the method then powers on the BILF display at a step 208. The method then continues to a step 210 to convert the REHF display video signal to a BILF display video signal. In some embodiments, a preview screen may be displayed on an REHF display before sending to a BILF display. As may be appreciated, resolution, color and frame rate differences must be resolved before migrating a signal to a BILF display. Any number of conversion methods known in the art may be utilized without departing from the present invention. As may be appreciated, video signals sent to the BILF in any manner well-known in the art without departing from the present invention. Thus, in some embodiments, a wired connection may include: PCMCIA, SDIO, USB, Serial, and DVI. In other embodiments, a wireless connection may include: Bluetooth, 802.11a, 801.11b, 802.11g, 2.4 GHz wireless, IR wireless, and ultra wide band.

To illustrate an embodiment employing application migration and screen synch between two complimentary displays, the following steps illustrate a usage model that includes a smart-phone configured with an LCD and connected through Bluetooth link with an EPD device. Both displays are configured with similar resolution but the LCD is color and the EPD device is monochrome.

Step 1: Begin a reading application (like Microsoft Windows Mobile WORD) on the phone. In this condition, the application displays a first reading page on the smart-phone LCD while the EPD device remains blank.

Step 2: Press a key (mapped to a migration command) on the smart-phone side to start a screen-synch session. Migration turns the EPD device on and displays the first reading page on the EPD device in monochrome. In some examples, a best display color and best display resolution may be automatically configured upon sensing a type of device. In some examples, the smart-phone may enter a standby mode to conserve battery power.

Step 3: Press a key (mapped to a pagination command) on the EPD device to page up or down. Paging on the EPD displays a newly navigated page of the WORD application running at the smart-phone device. When paging is performed on the EPD, the smart-phone LCD can synch up immediately (although the newly navigated page may not be visible if the smart-phone is in a standby mode with the LCD turned off). Zooming a page to different font size may be also be accomplished on the EPD device side via a key mapped to a zoom command.

Step 4: Press a key (mapped to a search command) to search for a text string. For smart-phones having search capability, searching for a text string may be accomplished on the LCD mart-phone side. When a text string is found, a new page containing the first occurrence of the specified string may be displayed on the LCD. Meanwhile the EPD device may synch up to the same page in a few seconds. Reading may then resume at the EPD device.

Step 5: Press a key (mapped to a session termination command) to end the screen-synch session and to close read activity on the EPD device side. The smart-phone maintains the last browsed page on the EPD device prior to invoking the terminate session command.

Optional Configuration: In some embodiments, if the smart-phone includes an integrated EPD display, migration and screen synch operations can occur between the smart-phone LCD and the integrated EPD display. This means that the smart-phone can select one of the two EPD displays to be its complimentary display. The above examples illustrate methods that are configured to take advantage of EPD reading advantages on mainstream applications that are generally developed for use with an. Additionally, in some embodiments, an application configured to be aware of the presence of both an LCD and an EPD displays might be enabled to display different content of the same application on each display. Thus, for example, an LCD may be selected to display a table of contents of, for example, the Bible while an EPD may be selected to display the Book of John. Multi-tasking may also be enabled utilizing one (or more) EPDs in a reading session of one application while an attached LCD runs a different application each of which may provide access to application commands by selectively pressing a key mapped to a display selection command. Therefore, many configurations as described may be practiced without departing from the present invention.

At a next step 212, the method displays and refreshes a BILF display at a rate corresponding with the display rate of the particular BILF display. As may be appreciated, unlike printing to a BILF display, migrating to a BILF display results in a display from which an application may be navigated. That is, utilizing methods described herein, a BILF display may serve a purpose similar to conventional REHF displays. In one embodiment, video signals sent to an REHF display and to a BILF display may correspond with a common application. In some embodiments, video signals may correspond with a common screen or with different screens within the common application. Further, in some embodiments, screen commands or menus may be accessed from either an REHF display or a BILF display. Still further, in some embodiments, video signals sent to an REHF display and to a BILF display may correspond with different applications. Thus, in some embodiments, a user may navigate one or more applications of REHF and BILF displays more or less simultaneously.

The application migration techniques described above may be applied in a plurality of different modes of operation for a browser application, where each mode of operation enables an application to migrate its control between the REHF and BILF screens. In one embodiment, the browser application is a web browser, which can receive and render web pages obtained from various web sites. In other embodiments, the browser application enables reading of other types of documents, including books, magazines, and any other text-based documents, as well as multimedia items such as pictures, videos, and games.

In one embodiment, the modes of operation include: READ MODE, EXTEND MODE and NAVIGATE MODE. Either REHF or BILF could have touch-screen commands to start the common application. Embodiments of the invention allow a common application to take commands from REHF or BILF screens and directly output through the access of the frame buffers of REHF screen and BILF screens. The common application migration allows the application to migrate its control of the application frame buffers of either the REHF or BILF screen for content reading.

A user may also use the REHF or BILF touch-screen to enter reading commands to switch between modes (e.g., NAVIGATE, READ, EXTEND MODES) or to change font sizes and font types. The change would reflect to both screens through the updates of the frame buffers by the common application.

READ MODE

In one embodiment, the READ MODE design enables a common application to rapidly find the reading material with REHF display and then map the reading material to BILF display. The device can also later switch the reading content from the BILF display back to the REHF display. The switch between the BILF and REHF displays beneficially maintains alignment at the anchor point before the switch. For example, the anchor point may be defined as the content shown at the upper left corner of the screen before the switch. Since the BILF and REHF may have different display sizes, the anchor point may define the position in a particular document the reader is viewing, and the common application maintains this position when the switch is performed.

Figure 11:
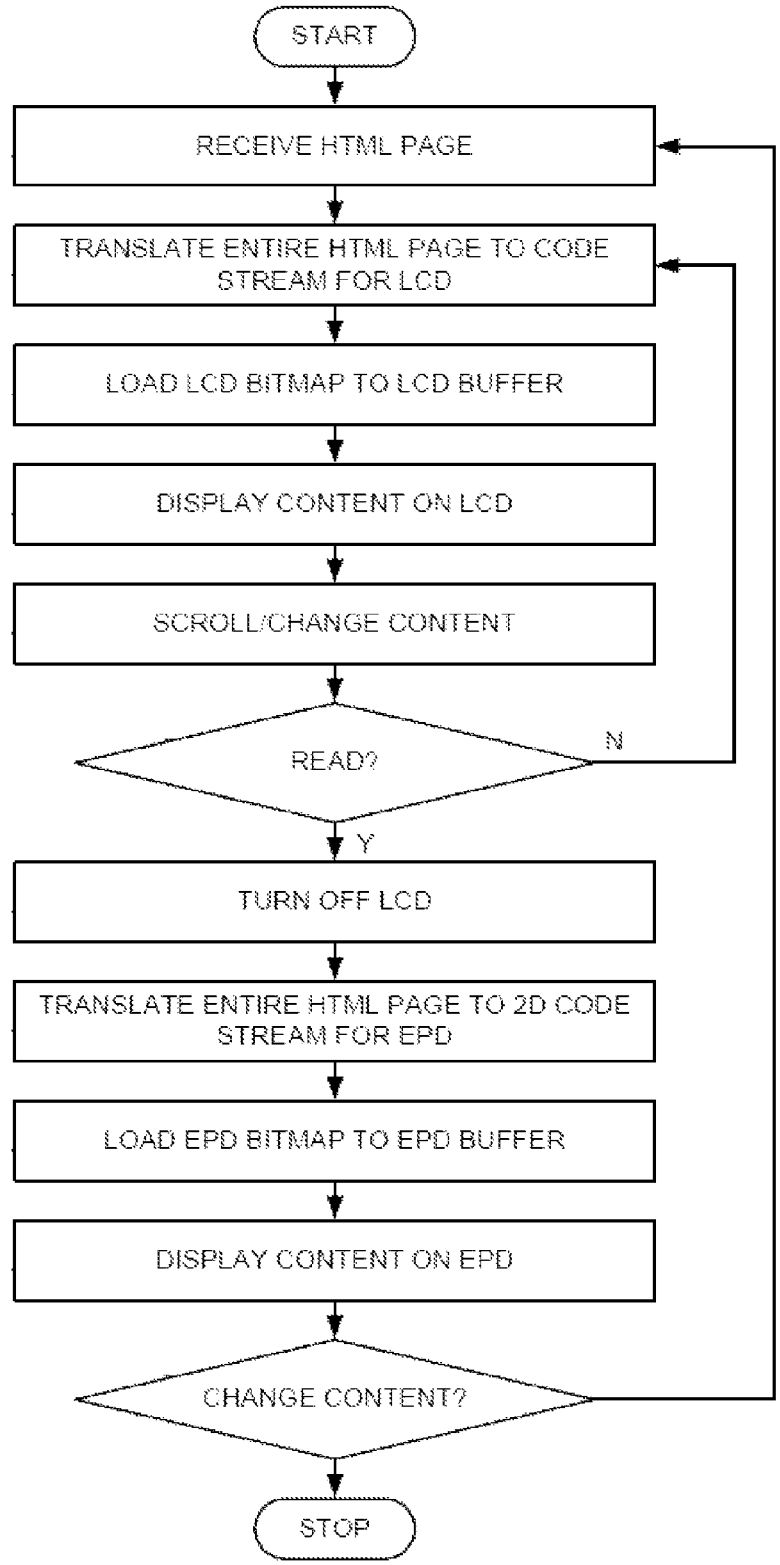
FIG. 11 is a flowchart for a browser in READ MODE, in accordance with an embodiment of the invention.

An example of the a process for performing the READ MODE is shown in FIG. 11, and described as follows.

Step 1: Rapidly navigate and find reading material on a REHF display. For example, a user can use a browser to go to Google's books mobile website to search a book and then open the book to read on the Web.

Step 2: To enter READ MODE, the user can selects a command (through MENU selection on REHF or BILF screen or through a hardware button) to "project" or "switch" from REHF to BILF screen. The display is aligned at the anchor point after the switch. After the switch, the user can read different pages on the BILF screen. One design option is to turn off the REHF display to save power after the switch from REHF to BILF display.

Step 3: Since the application directly controls the frame buffers of both BILF and REHF screens, it can switch the reading control from BILF screen back to REHF screen while keeping the anchor point to be the same at both screens. The migration and switch process of the reading control between the BILF and REHF screens may be repeated many times by the reader.

EXTEND MODE

The EXTEND MODE allows an application that reads content with hyperlinks (like webpage URLs, graphics icons, or Table of Content) on one screen to extend the content of the hyperlink to a new window in another screen. In one embodiment, the EXTEND MODE is performed according to the process shown in FIG. 12.

In the EXTEND MODE, a user may use a REHF screen to browse a page with some hyperlinks. The user selects a hyperlink in EXTEND MODE and the content of the hyperlink on REHF screen is projected to the BILF screen. Effectively, the user can now make the BILF screen a new window to show the content of the REHF hyperlink. Alternatively, the user can also make the REHF screen a new window to show the content of BILF hyperlink if the touch-screen capability is implemented on the BILF screen.

The EXTEND MODE may have reading windows with different content on BILF and REHF screens and works like multiple windows for reading on two different types of screens. This is contrasted with the READ MODE, which typically has the same content on BILF and REHF screens.

One design variation of the EXTEND MODE is to use a progress bar graphics representing the reading progress of a book on the REHF screen. The progress bar cursor may be moved by the finger through REHF touch-screen input to select a particular page of the book to read on the BILF screen. At the end of the cursor movement on REHF screen, the corresponding page of the book may be shown on the BILF screen.

Another design variation of the READ MODE or EXTEND MODE is to have touch-screen capability for the BILF display in either READ or EXTEND MODE. Commends may be directly entered through the BILF touch-screen. This touch-screen capability is increasingly popular with BILF display (including the Mirasol display from Qualcomm). The content on REHF would be updated when the command is executed on BILF screen in the READ mode. This way, READ mode can still have the option to switch the reading back to the REHF screen.

NAVIGATE MODE

Figure 13:
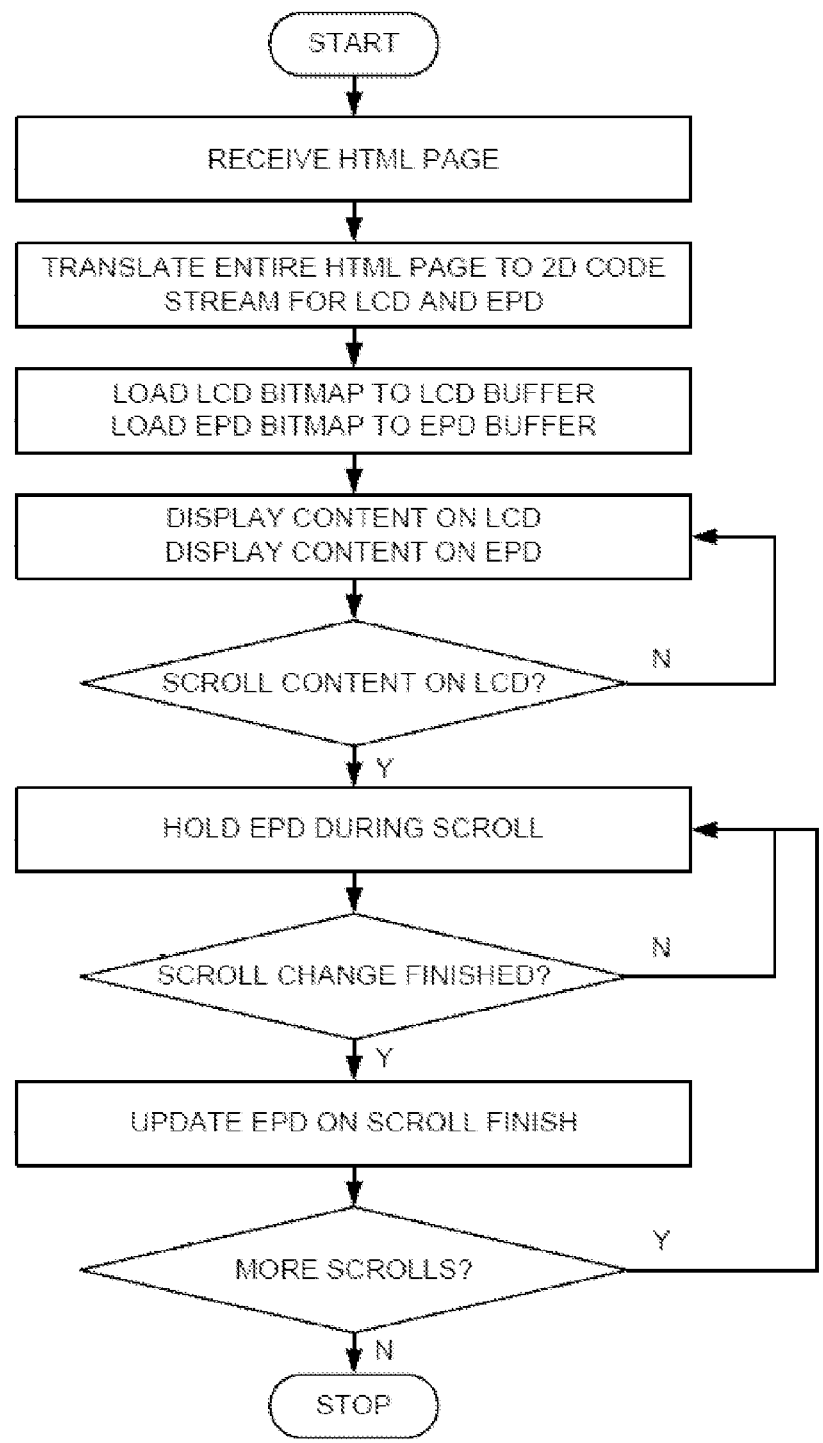
FIG. 13 is a flowchart for a browser in EXTEND MODE, in accordance with an embodiment of the invention.

In one embodiment, a user uses the NAVIGATE MODE to effectively scroll the full page on the BILF screen with the help of REHF touch-screen controlled by a common application. FIG. 13 illustrates a process of operation in the NAVIGATE MODE, in one embodiment. The NAVIGATE MODE may be used, for example, to read particular web content on the BILF screen. In NAVIGATE MODE, web page content from the REHF screen is projected onto the BILF screen for reading, as in the READ MODE; however, the NAVIGATE MODE has the capability to let a user effectively scroll the entire screen on BILF screen.

To scroll to a different anchor point of the web page on the BILF screen, the user can touch and hold the content box (i.e., the boundary of the reading content area) on the touch screen of REHF display, and slide to move the content box up, down, to the left, or to the right. When the user releases the REHF touch screen, the new anchor point of the content box is reflected onto the BILF screen. The content box may have the size of the entire screen of the REHF screen and therefore need not be drawn on the screen.

This technique can be used to make REHF screen scroll left/right or up/down with the slow frame rate as the BILF screen update happens only after the user release the hold on REHF touch screen after the scroll is completed to the desired anchor point.

The BILF and REHF display systems described here could be connected via wired or wireless link. The applications would behave the same way as tightly-coupled display with local buses with two displays. The commands and data are sent back and forth between two display systems to achieve the desired usage of the dual displays systems for the required reading purpose.

Browser Implementation Example

The following describes an implementation example of the design using Google's Android OS and Chrome browser for the READ MODE, EXTEND MODE and NAVIGATE MODE, described above. Other applications for education and reading usages could be implemented with similar techniques. The example uses LCD as an example REHF display and EPD as an example BILF display in the implementation notes. With the release of the WebKit-based browser in Android, Google also introduced a handful of new backends for the browser engine, including the Skia graphics library (SGL). Skia is a complete 2D graphic library for drawing Text, Geometries, and Images. Embodiments of the invention translate HTML page to SGL code stream that can be used to draw the bitmap of the entire HTML page. A portion of the bitmap of the HTML page is mapped to the EPD screen or LCD screen. The following is the description to show how each mode works.

Figure 14:
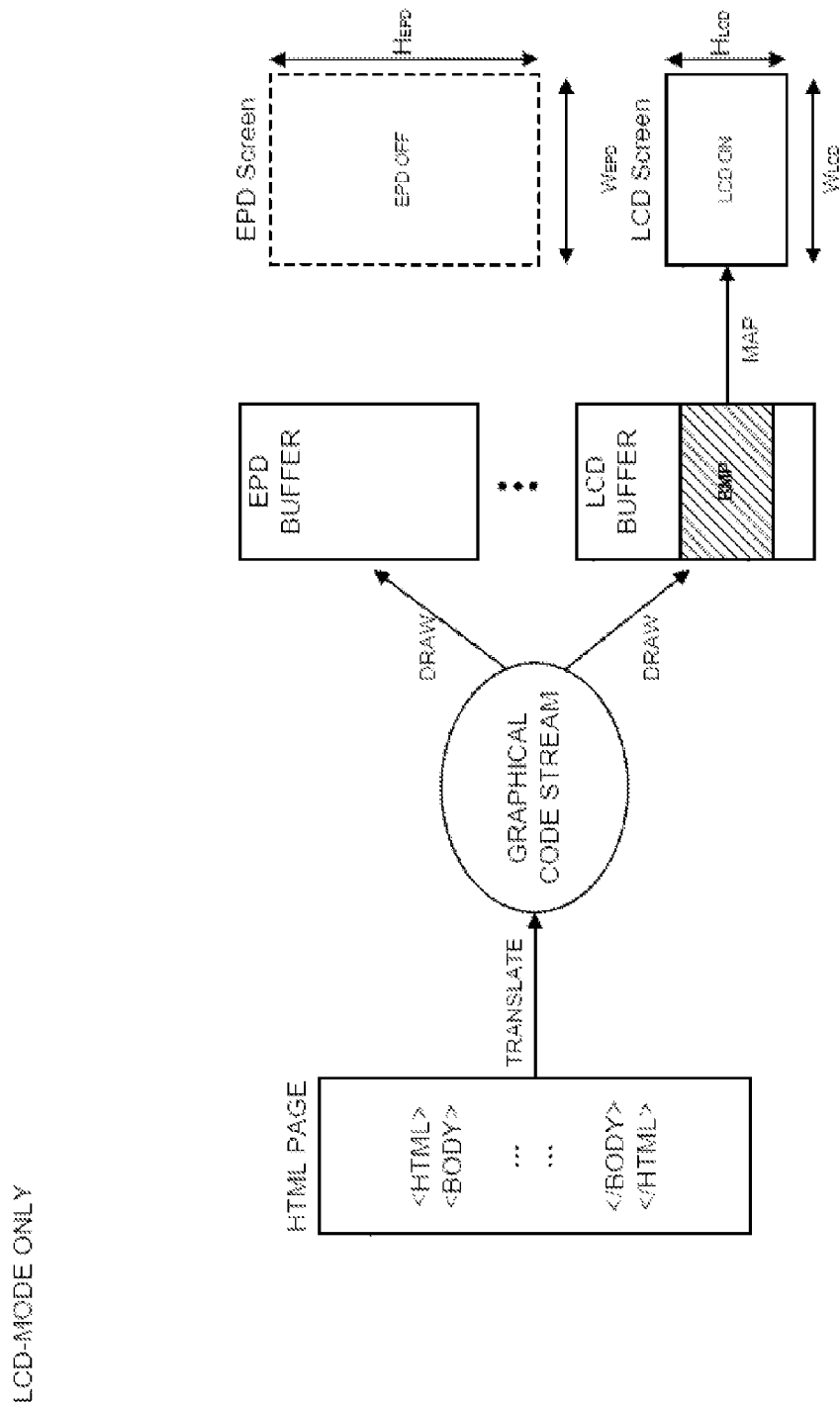
FIG. 14 is a diagram of the browser content and application frame buffers for LCD-MODE ONLY, in accordance with an embodiment of the invention.
Figure 15:
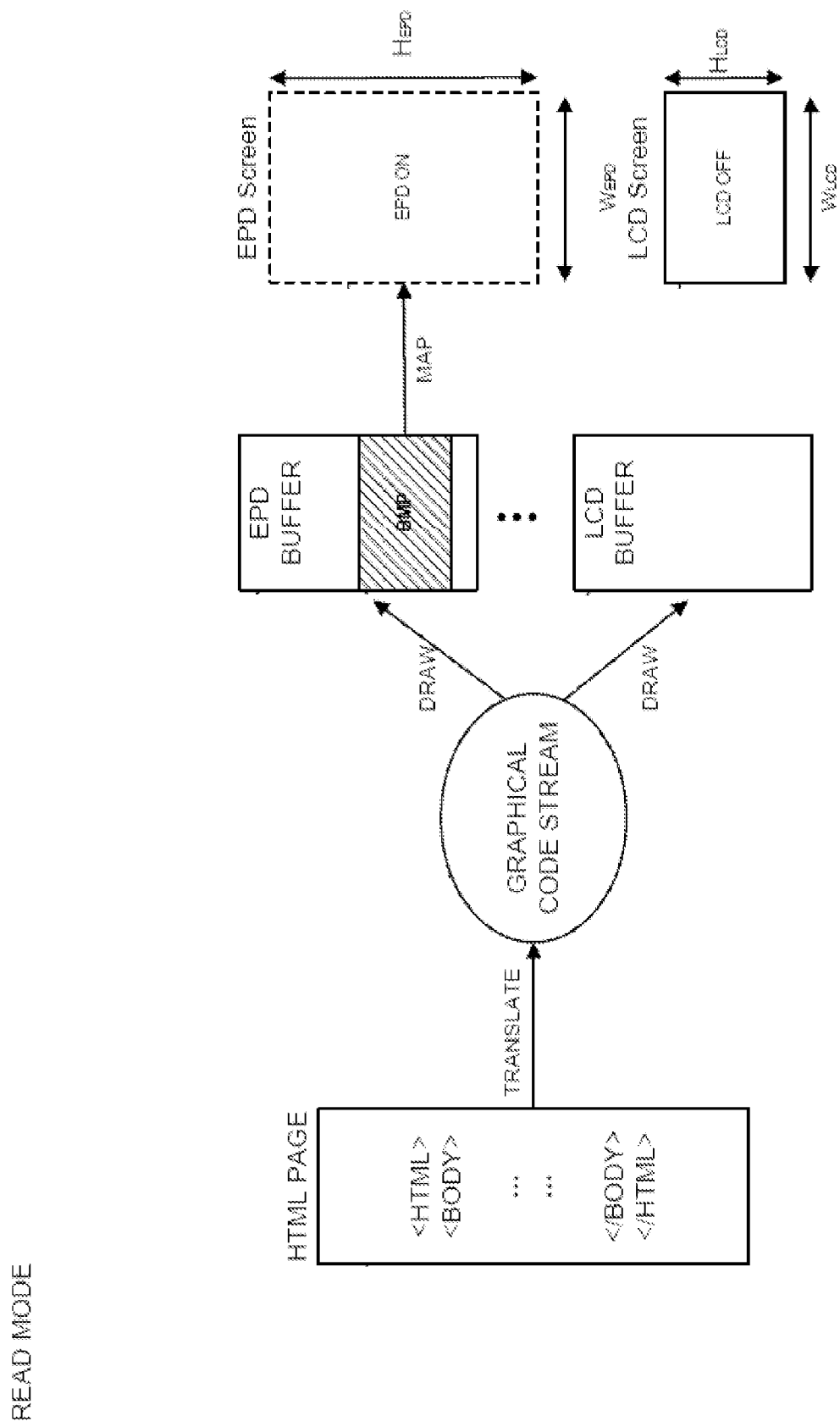
FIG. 15 is a diagram of the browser content and application frame buffers for READ MODE, in accordance with an embodiment of the invention.

BROWSER READ MODE: FIG. 14 illustrates a process of a LCD-ONLY MODE and BROWSER READ MODE. The content and frame buffer management is shown in FIG. 15 diagram for BROWSER READ MODE. The browser starts out with LCD-ONLY MODE (as shown in FIG. 14) with a section of HTML page appears on LCD. The browser loads a HTML page in a HTML code buffer. It then translates the HTML page to SGL code stream that describes the LCD bitmap of the entire page (for LCD screen). The bitmap drawn is kept in a LCD HTML bitmap buffer. The browser maps the section of the HTML bitmap buffer to show on LCD screen.

A user can scroll the LCD bitmap to different location or change and load to a different HTML page. The browser would then repeat the same translation, drawing and mapping processes to show the content on LCD.

When a user selects the READ MODE command to put the device in READ MODE during the read on LCD screen, the system and its buffers work as follows. First, the browser turns off the LCD screen during the READ MODE. Second, the browser translates the HTML page to SGL code stream that describe the EPD bitmap of the entire page (for EPD screen). The bitmap is kept in an EPD HTML bitmap buffer. The browser then maps the section of the HTML bitmap buffer to show on the EPD screen. The EPD screen often has different attributes than LCD screen such as screen width, screen height, and screen color levels.

Figure 17:
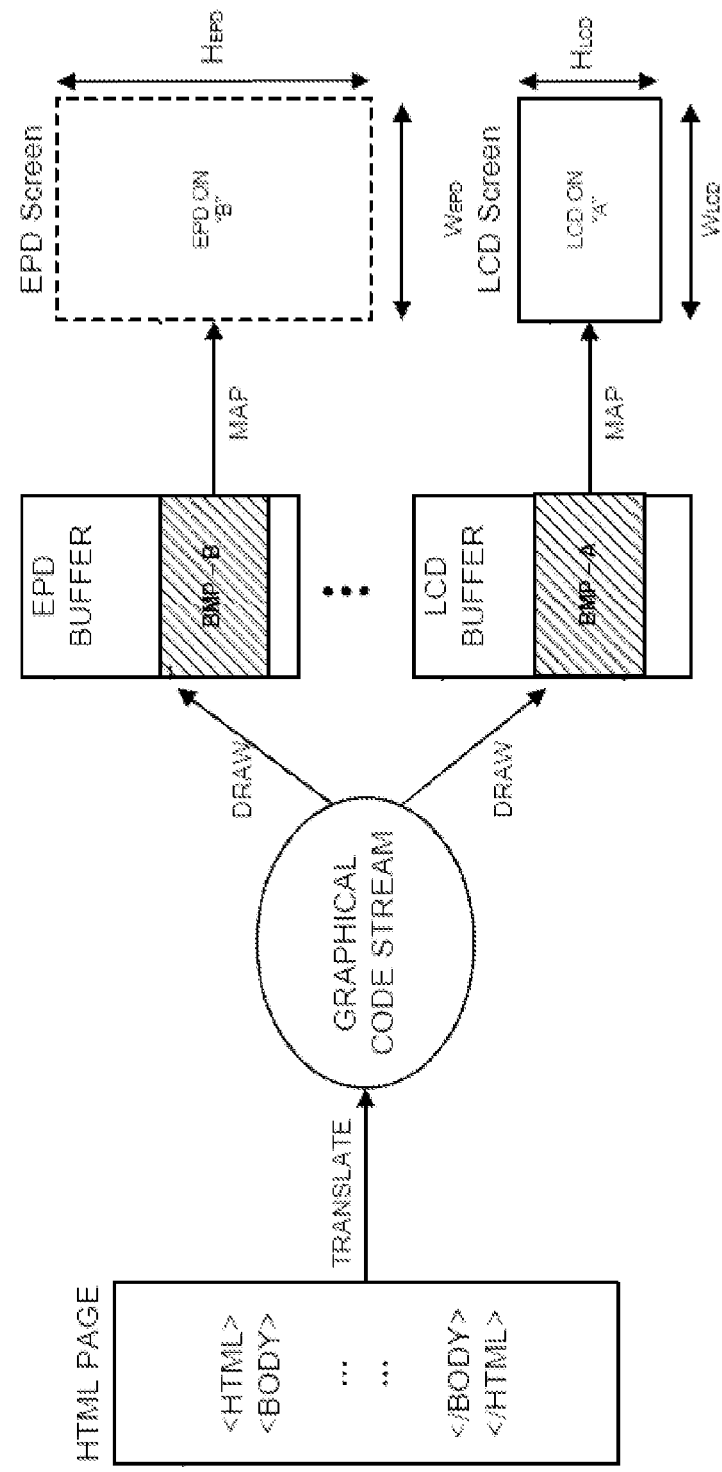
FIG. 17 is a diagram of the browser content and application frame buffers for NAVIGATE MODE, in accordance with an embodiment of the invention.

BROWSER NAVIGATE MODE: The NAVIGATE MODE is similar to READ MODE except that LCD screen is not turned off when the user reads on the EPD. The flowchart of FIG. 13 shows the steps of the BROWSER NAVIGATE MODE, and the content and frame buffer management is shown in FIG. 17 for BROWSER NAVIGATE MODE. In one embodiment, the process is as follows:

Step 1: The browser loads a HTML page in a HTML code buffer.

Step 2: The browser translates the HTML page to SGL code stream that describes the bitmap of the LCD and EPD of the entire page (for either LCD or EPD screen). In this design example, the same content is shown per line (the width of the screen) on both LCD and EPD. The browser zooms out to enlarge the content if EPD is bigger size (and resolution) than LCD.

Step 3: When the user scrolls the screen on the LCD, the browser can update the LCD screen real time with the new bitmap. At the end of the scrolling (i.e., when the holding of the hand is off), the browser can update the EPD screen according to the bitmap buffer and its new beginning location.

Step 4: The device effectively allows the EPD screen to show the scroll and navigation with the assist of LCD screen fast frame rate and touch screen capability.

Figure 12:
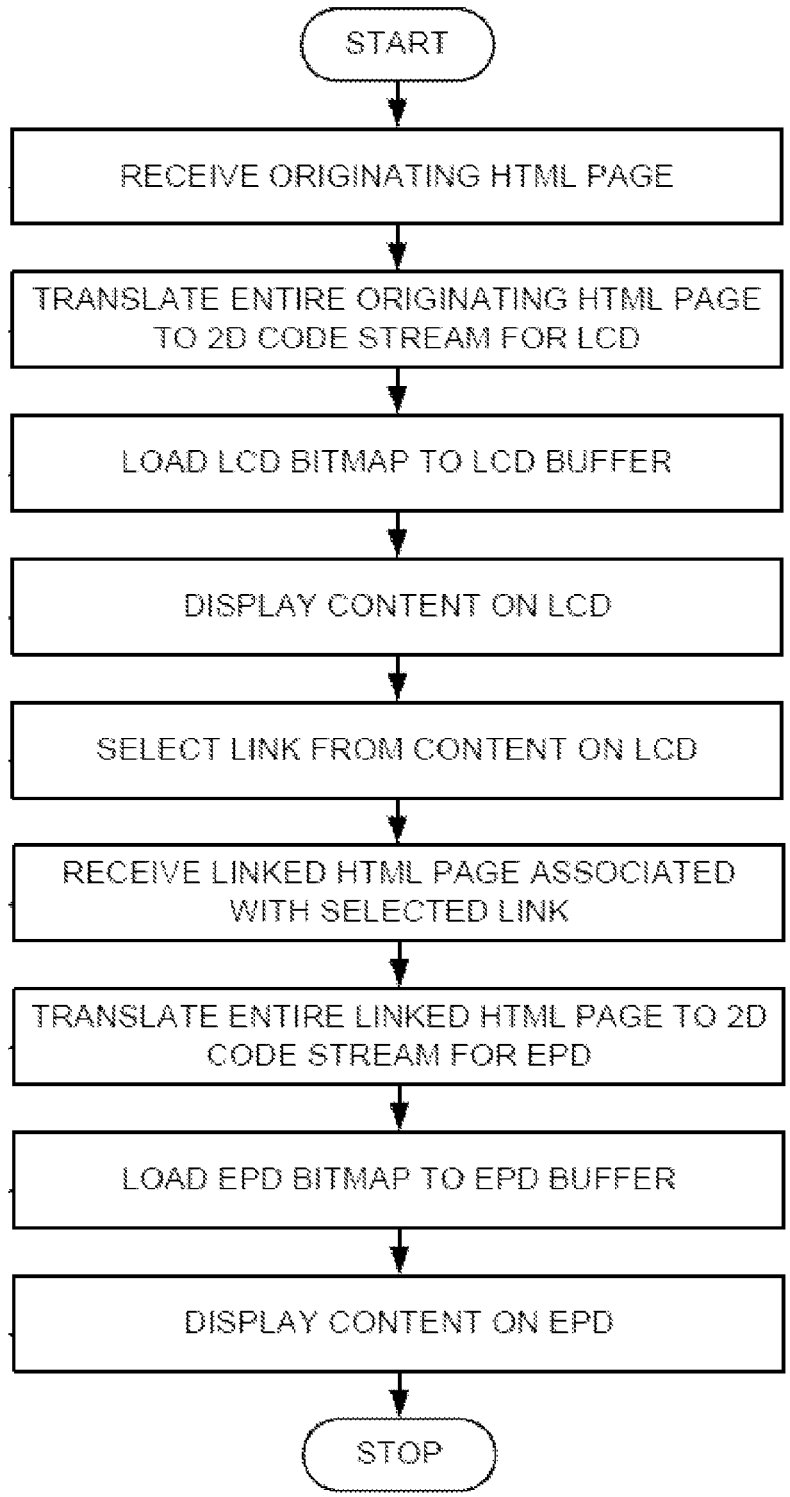
FIG. 12 is a flowchart for a browser in NAVIGATE MODE, in accordance with an embodiment of the invention.
Figure 16:
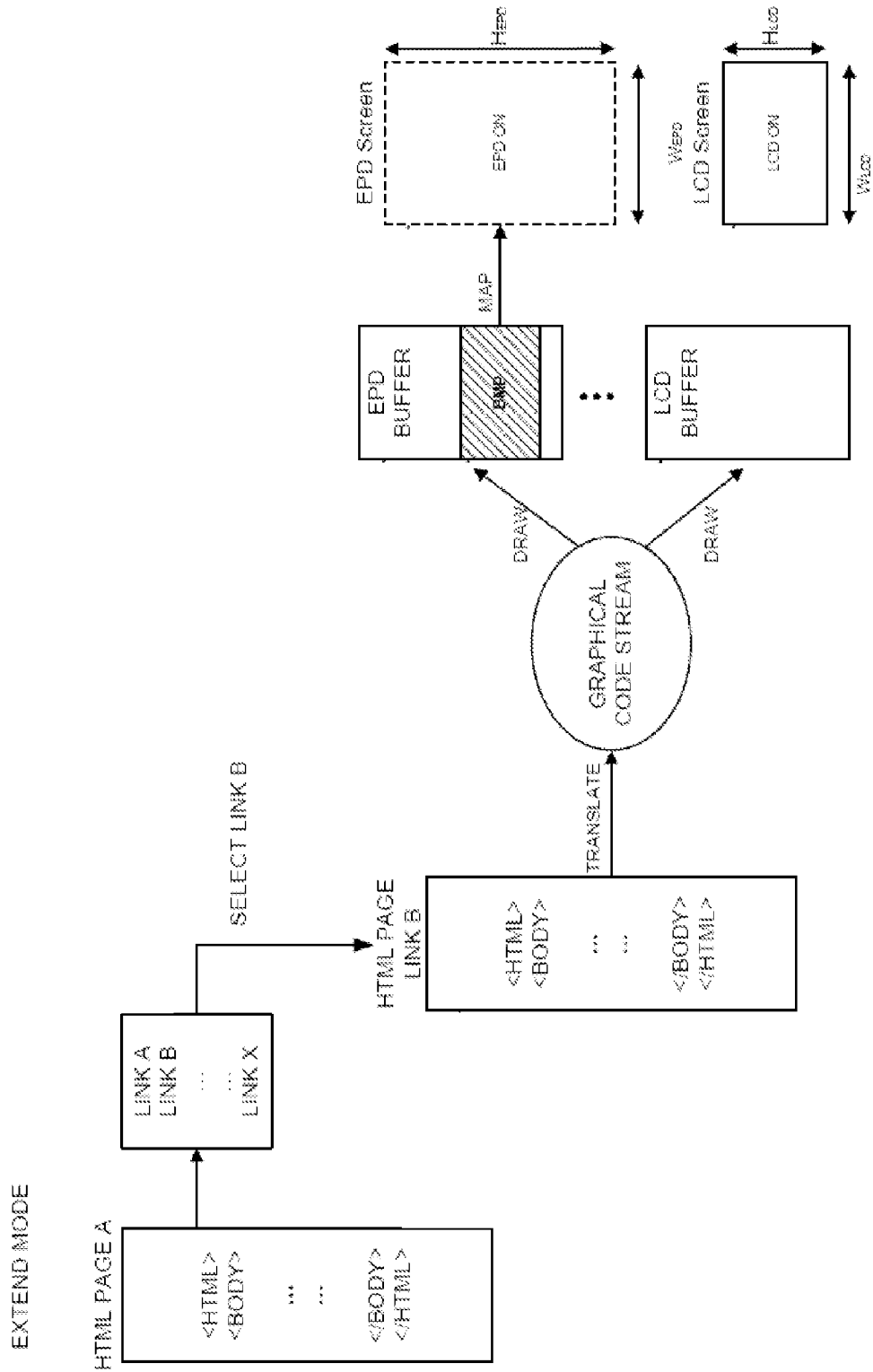
FIG. 16 is a diagram of the browser content and application frame buffers for EXTEND MODE, in accordance with an embodiment of the invention.

BROWSER EXTEND MODE: The EXTEND MODE may be a special case of the LCD-ONLY MODE used to read the link of the HTML page on the EPD display. The browser may start out in the LCD-ONLY MODE with a section of an HTML page appearing on the LCD display. As described, FIG. 12 shows the steps of the EXTEND MODE, which may be used with a browser. The content and frame buffer management is shown in FIG. 16 diagram for the EXTEND MODE. In one embodiment, the process is as follows:

Step 1: The browser loads a HTML page in a HTML code buffer.

Step 2: The browser translates the HTML page to SGL code stream that describes the LCD bitmap of the entire page (for LCD screen). The bitmap drawn is kept in a LCD HTML bitmap buffer. The browser maps the section of the HTML bitmap buffer to show on LCD screen.

Step 3: A user requests the browser to enter EXTEND MODE. The HTML page may have a hyperlink, called LINK-A. If the user click LINK-A on the LCD screen, the browser downloads an HTML file for LINK-A to a new HTML code buffer to be shown on EPD screen.

Step 4: The browser translates the new HTML page to a new SGL code stream that describes the EPD bitmap of the entire page (for EPD screen). The bitmap drawn is kept in an EPD HTML bitmap buffer. The browser maps the section of the new HTML bitmap buffer to show on EPD screen. This represents the LINK-A shown on EPD screen as a new window. The existing LCD screen is not changed.

In this way, embodiments of the invention allow the fast LCD screen to find the browser page first and then show the corresponding LINK to read on EPD. The device leverages the benefits of the EPD screen for reading while allowing the LCD screen to handle the fast search and scroll work.

Figure 3:
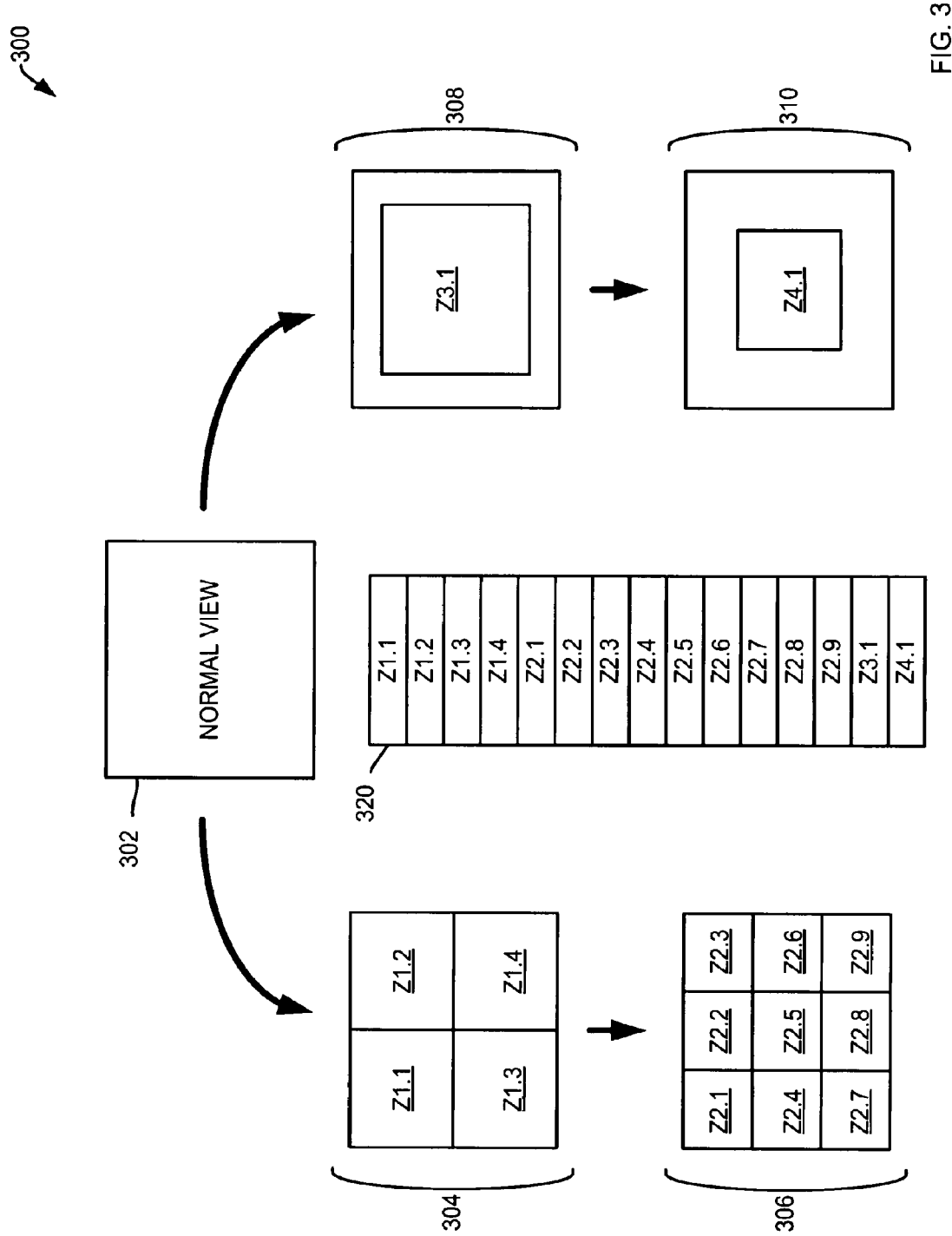
FIG. 3 is an illustrative representation of a number of zooms and a zoom buffer in accordance with embodiments of the present invention.

FIG. 3 is an illustrative representation of a number of zooms (304, 306, 308, and 310) and a zoom buffer 320 in accordance with embodiments of the present invention. As illustrated, normal view 302 may be resized to accommodate any number of zooms. It may be appreciated that zooming, in this manner, is relevant to printing an image to a BILF display as illustrated in flowchart 100 (see FIG. 1). Thus, in some embodiments, a first zoom 304 may include four images that may be zoomed to normal size for viewing; a second zoom 306 may include nine images that may be zoomed to normal size for viewing; a third zoom 308 may include a reduced image; and a fourth zoom 310 may include a further reduced image. Zooms may include ranges of approximately: 40 to 69%; 70 to 99%; 101 to 175%; and 176 to 300% without departing from the present invention. As may be appreciated, zooms illustrated are disclosed for clarity in understanding embodiments of the present invention. As such, any number of other zooms may be employed without departing from the present invention.

Zoom buffer 320 may be utilized to store all of the zoom frames. In one embodiment, zoom buffer may be configured to store at least 15 zoom frames. In some embodiments, zoom buffer may be configured to store more than 15 zoom frames. As may be appreciated, the number of zoom frames stored is directly related to image resolution and storage size. In some embodiments, zoom frames may be displayed sequentially as loaded into a zoom buffer. In other embodiments, zoom frames may be displayed non-sequentially. Thus, any method of accessing zoom frames may be utilized without departing from the present invention.

Figure 4:
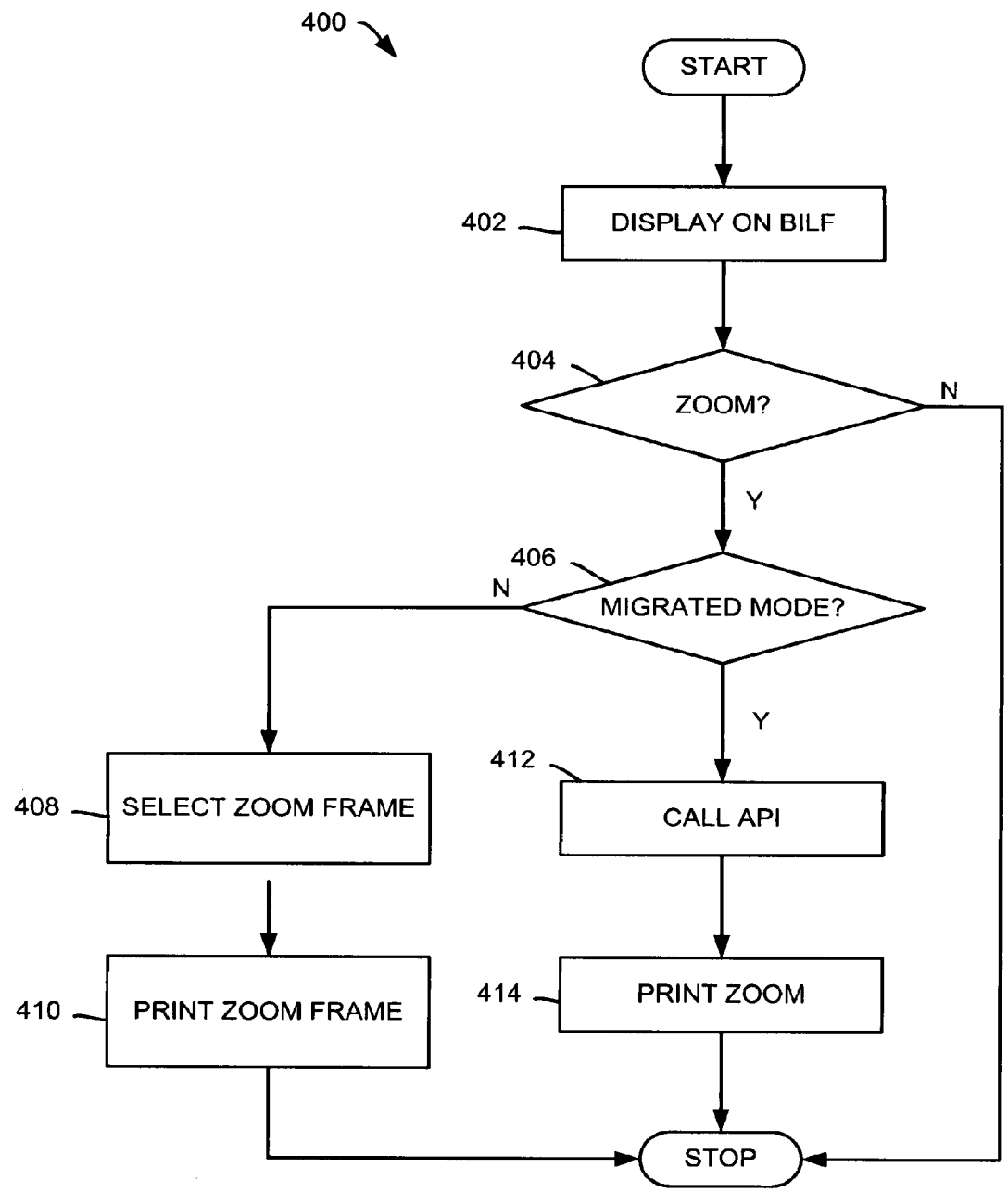
FIG. 4 is an illustrative flowchart for zooming on a BILF display in accordance with embodiments of the present invention.

FIG. 4 is an illustrative flowchart 400 for zooming on a BILF display in accordance with embodiments of the present invention. As noted above, when an image is printed to a BILF display, the image is a bistable static image. That is, when printing, an image is captured at a moment in time and is not updated unless a user initiates an update. As such, zooming requires specialized handling to accommodate this characteristic. At a step 402, an image is being displayed on a BILF display. At a next step, 404 the method determines whether zooming is required. Zooming may be user initiated in any number of manners well-known in the art without departing from the present invention. For example, in an embodiment, a zoom button embodied in a physical or virtual interface may serve to provide zoom input. If the method determines at a step 404 that a zooming is not required, the method ends. If the method determines at a step 404 that paging is required, the method determines whether the BILF display is in a migrated mode at a step 406. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 406 that the BILF display is in a migrated mode, then the method calls the application API at a step 412 for a requested zoom. The method then prints the zoomed image to the BILF display at a step 414, whereupon the method ends. In a migrated example, the BILF display is then refreshed at the display frequency rate. If the method determines at a step 406 that the BILF display is not in a migrated mode, then the method selects a desired zoom frame from a zoom buffer at a step 408. As noted above, any number of zoom frames may be selected from a zoom buffer (see FIG. 3). Thus, zoom frames may be selected sequentially or non-sequentially without departing from the present invention. The method then prints the selected zoom frame from a zoom buffer at a step 410 whereupon the method ends. In addition to displaying a selected zoom, zoom frames may also provide for panning features that would otherwise require a user to re-access an application that is being displayed on a BILF.

Figure 5:
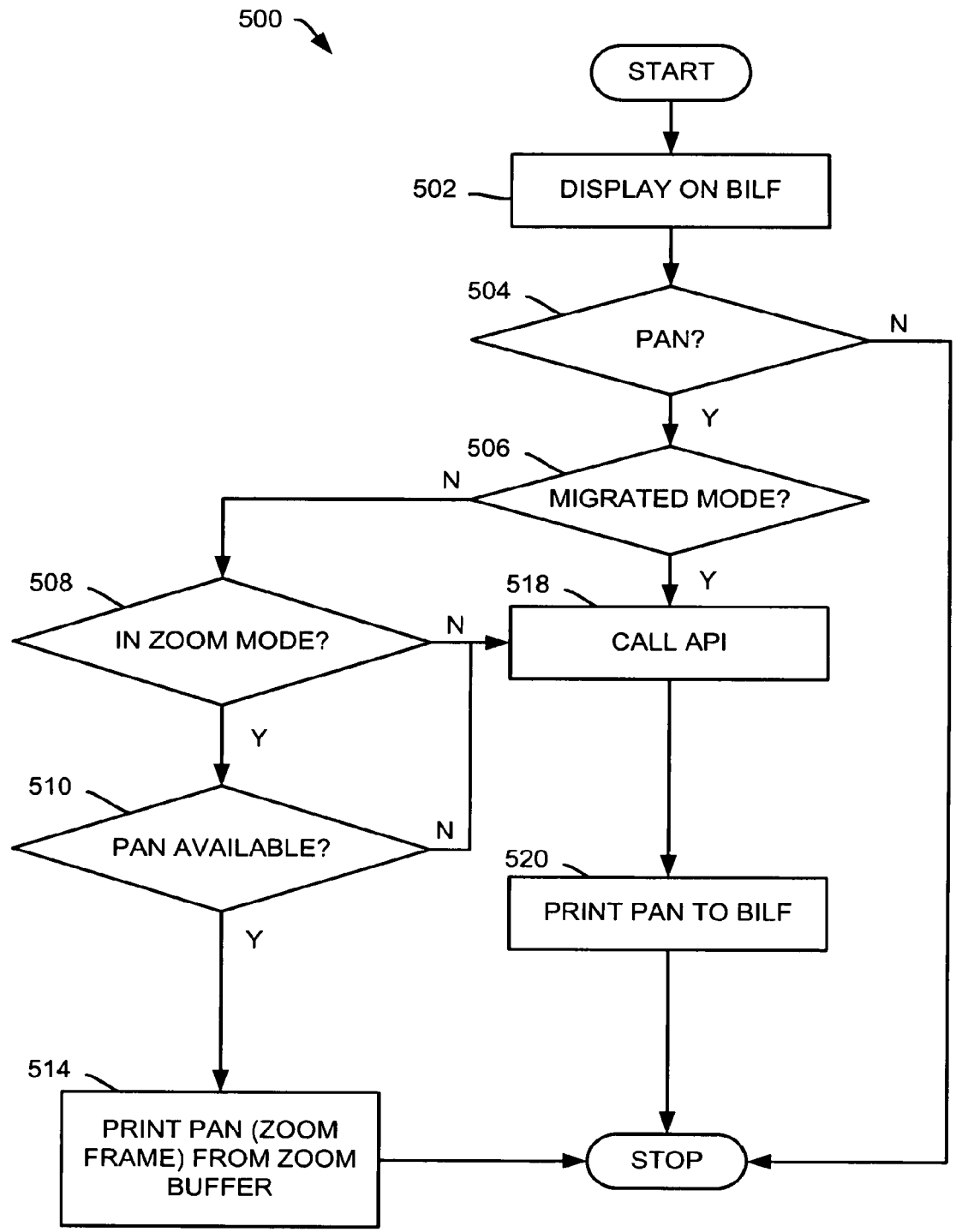
FIG. 5 is an illustrative flowchart for panning on a BILF display in accordance with embodiments of the present invention.

FIG. 5 is an illustrative flowchart 500 for panning on a BILF display in accordance with embodiments of the present invention. As noted above, when an image is printed to a BILF display, the image is a bistable static image. That is, when printing, an image is captured at a moment in time and is not updated unless a user initiates an update. As such, panning requires specialized handling to accommodate this characteristic. At a step 502, an image is being displayed on a BILF display. At a next step, 504 the method determines whether a pan is required. A pan may be user initiated in any number of manners well-known in the art without departing from the present invention. For example, in an embodiment, a pan button embodied in a physical or virtual interface may serve to provide panning input. If the method determines at a step 504 that a pan is not required, the method ends. If the method determines at a step 504 that a pan is required, the method determines whether the BILF display is in a migrated mode at a step 506. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 506 that the BILF display is in a migrated mode, then the method calls the application API at a step 518 for an appropriate pan. The method then prints the pan to the BILF display at a step 520 whereupon the method ends. In a migrated example, the BILF display is then refreshed at the display frequency rate. If the method determines at a step 506 that the BILF display is not in a migrated mode, then the method determines whether the BILF display is currently in a zoom mode. That is, whether a zoom frame is currently being displayed. If the method determines at a step 508 that the BILF display is not in a zoom mode, then no pan image is available and the method continues to a step 518. If the method determines at a step 508 that the BILF display is in a zoom mode, then a determination of whether a panned image is available is made at a step 510. As may be appreciated, some zoom frames may not include panned images. For example, a zoom frame having a zoom of less than 100% will not include any panned images. If the method determines at a step 510 that a pan is not available, then the method the method continues to a step 518. If the method determines at a step 510 that a pan is available, then the method may print a selected pan (i.e. zoom frame) from the zoom buffer whereupon the method ends.

Figure 6:
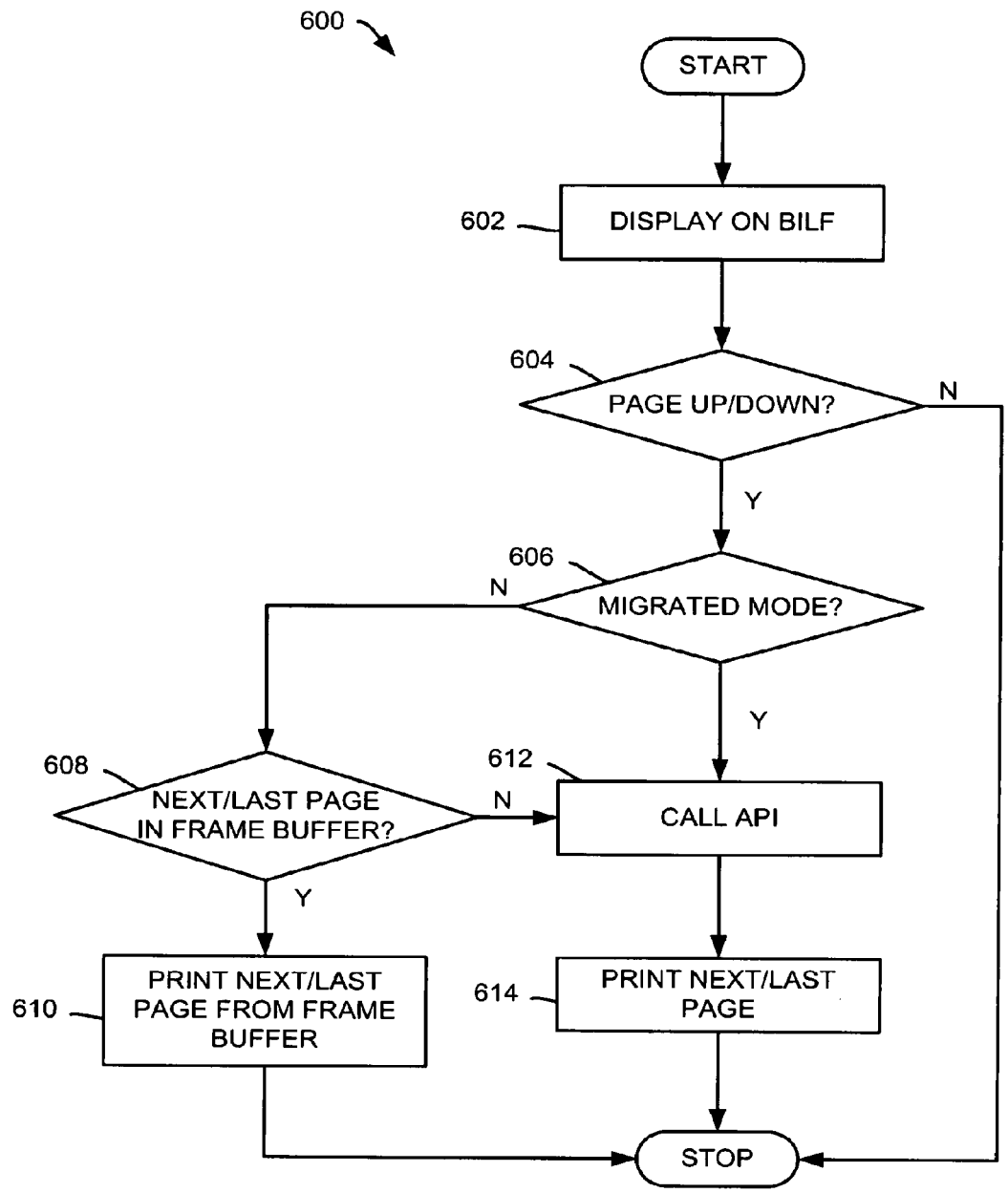
FIG. 6 is an illustrative flowchart for paging up and down on a BILF display in accordance with embodiments of the present invention.

FIG. 6 is an illustrative flowchart 600 for paging up and down on a BILF display in accordance with embodiments of the present invention. As noted above, when an image is printed to a BILF display, the image is a bistable static image. That is, when printing, an image is captured at a moment in time and is not updated unless a user initiates an update. As such, paging requires specialized handling to accommodate this characteristic. At a step 602, an image is being displayed on a BILF display. At a next step, 604 the method determines whether paging is required. Paging may be user initiated in any number of manners well-known in the art without departing from the present invention. For example, in an embodiment, a paging button embodied in a physical or virtual interface may serve to provide paging input. If the method determines at a step 604 that a paging is not required, the method ends. If the method determines at a step 604 that paging is required, the method determines whether the BILF display is in a migrated mode at a step 606. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 606 that the BILF display is in a migrated mode, then the method calls the application API at a step 612 for a requested page (i.e. next/last page). The method then prints the page to the BILF display at a step 614 whereupon the method ends. In a migrated example, the BILF display is then refreshed at the display frequency rate. If the method determines at a step 606 that the BILF display is not in a migrated mode, then the method determines whether the requested page is present in a frame buffer at a step 608. As noted above, a frame buffer may be utilized to store a number of frames. A user may access frames stored in a frame buffer for display. If the method determines at a step 608 that the requested page is not in a frame buffer, then the method continues to a step 612. If the method determines at a step 608 that the requested page is in a frame buffer, then the method prints the requested page from the frame buffer at a step 610 whereupon the method ends.

Figure 7:
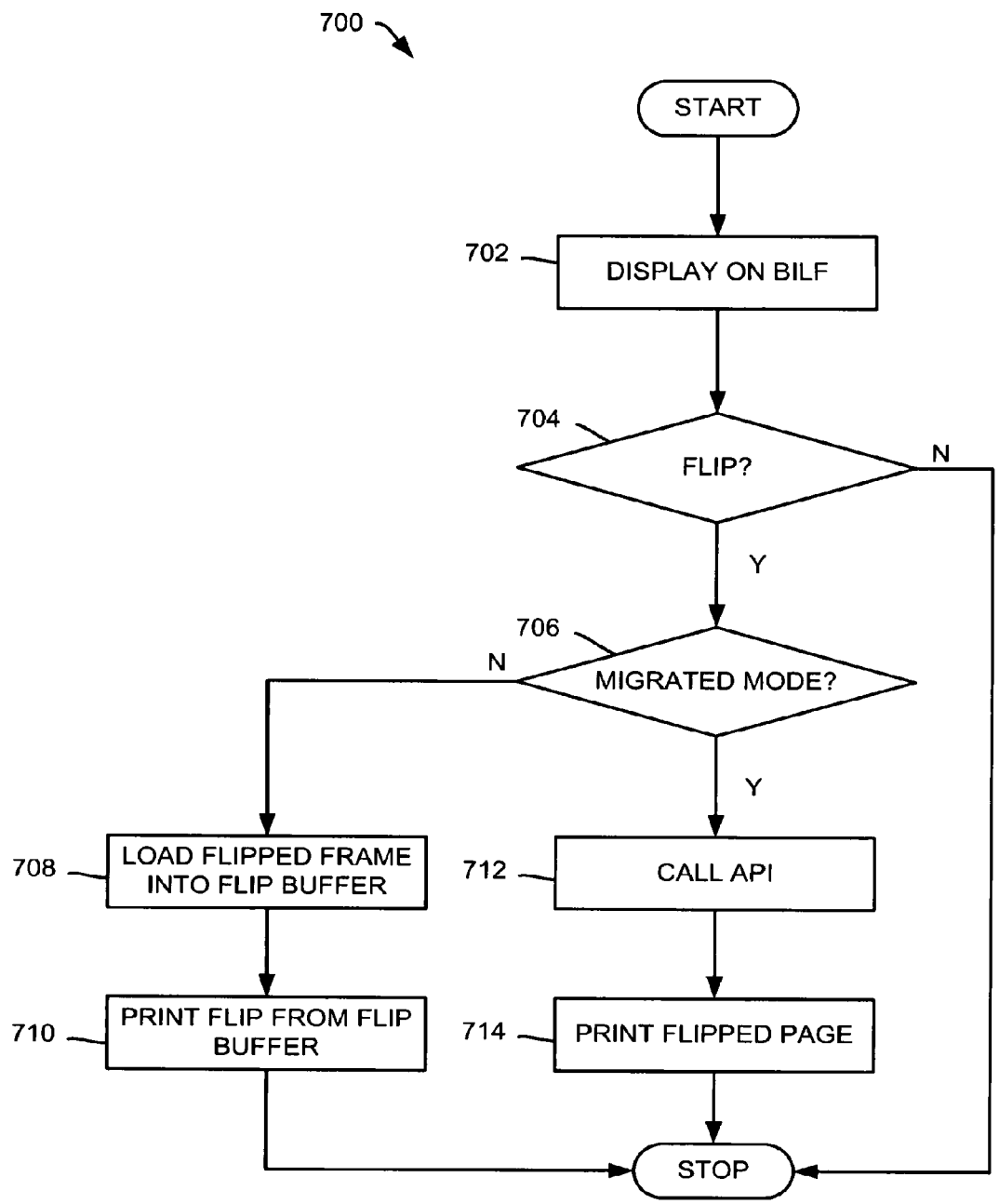
FIG. 7 is an illustrative flowchart for flipping an image on a BILF display in accordance with embodiments of the present invention.

FIG. 7 is an illustrative flowchart for flipping an image on a BILF display in accordance with embodiments of the present invention. As noted above, when an image is printed to a BILF display, the image is a bistable static image. That is, when printing, an image is captured at a moment in time and is not updated unless a user initiates an update. As such, flipping requires specialized handling to accommodate this characteristic. At a step 702, an image is being displayed on a BILF display. At a next step, 704 the method determines whether flipping is required. Flipping may be user initiated in any number of manners well-known in the art without departing from the present invention. For example, in an embodiment, a flipping button embodied in a physical or virtual interface may serve to provide flipping input. In some embodiments, flipping may be automated to correspond with a particular screen position. If the method determines at a step 704 that a flipping is not required, the method ends. If the method determines at a step 704 that flipping is required, the method determines whether the BILF display is in a migrated mode at a step 706. Migration is discussed in further detail above for FIG. 2. Notably, when a BILF display is in a migrated mode, the displayed application is navigable over the BILF display. When a BILF display is not in a migrated mode, then the displayed image is a static image which cannot be utilized to navigate an application.

If the method determines at a step 706 that the BILF display is in a migrated mode, then the method calls the application API at a step 712 to provide a flipped page. The method then prints the flipped page to the BILF display at a step 714 whereupon the method ends. In a migrated example, the BILF display is then refreshed at the display frequency rate. If the method determines at a step 706 that the BILF display is not in a migrated mode, then the method flips the current frame and loads a flipped frame of the current frame into a flip buffer at a step 708. In some embodiments, the flipped frame is loaded into a frame buffer. The method then prints the flipped frame from a flip buffer at a step 710 whereupon the method ends. Flipping a frame may have advantages in some portable electronic devices. For example, where a device may be opened to several positions to approximately 360°, flipping an image on a complementary display may provide a more convenient user experience.

Figure 8:
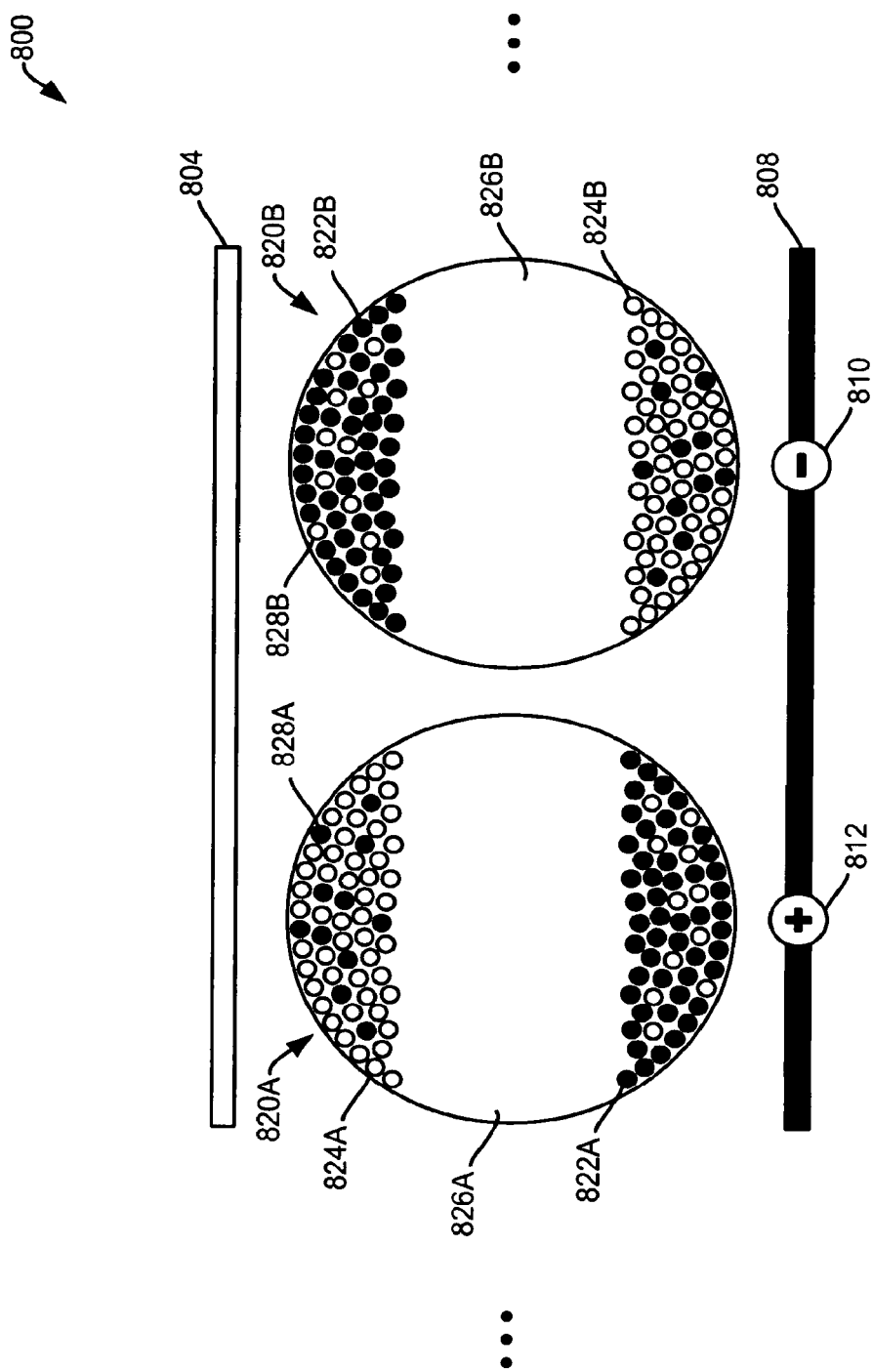
FIG. 8 is an illustrative representation of a portion of an electronic paper display (EPD) having a number of artifacts in accordance with embodiments of the present invention.

FIG. 8 is an illustrative representation of a portion of an electronic paper display (EPD) 800 having a number of artifacts in accordance with embodiments of the present invention. EPDs utilize a material called electronic ink and are commercially available under the trade name E INK®. Electronic ink includes millions of tiny microcapsules 820A and 820B, about the diameter of a human hair. In this example, each microcapsule 820A and 820B contains positively charged white particles 824A and 824B and negatively charged black particles 822A and 822B suspended in a clear fluid 826A and 826B. When a negative electric field is applied across top electrode 804 and bottom electrode 808, positively charged white particles 824A move to the top of microcapsule 820A where they become visible to the user. This makes the surface appear white at that spot. At the same time, an opposite electric field 812 pulls the negatively charged black particles 822A to the bottom of microcapsule 820A where they are hidden. By reversing this process and applying a positive electric field across top electrode 804 and bottom electrode 808, negatively charged black particles 822B appear at the top of microcapsule 820B, which now makes the surface appear dark at that spot. At the same time, an opposite electric field 810 pulls the positively charged white particles 824B to the bottom of microcapsule 820B where they are hidden. In some instances, some artifacts 828A and 828B may remain mixed with charged particles 824A and 822B. These artifacts may result in ghosting in some images which may render an image difficult or impossible to read. In order to remove artifacts, an image may cleaned by refreshing a displayed image.

Figure 9:
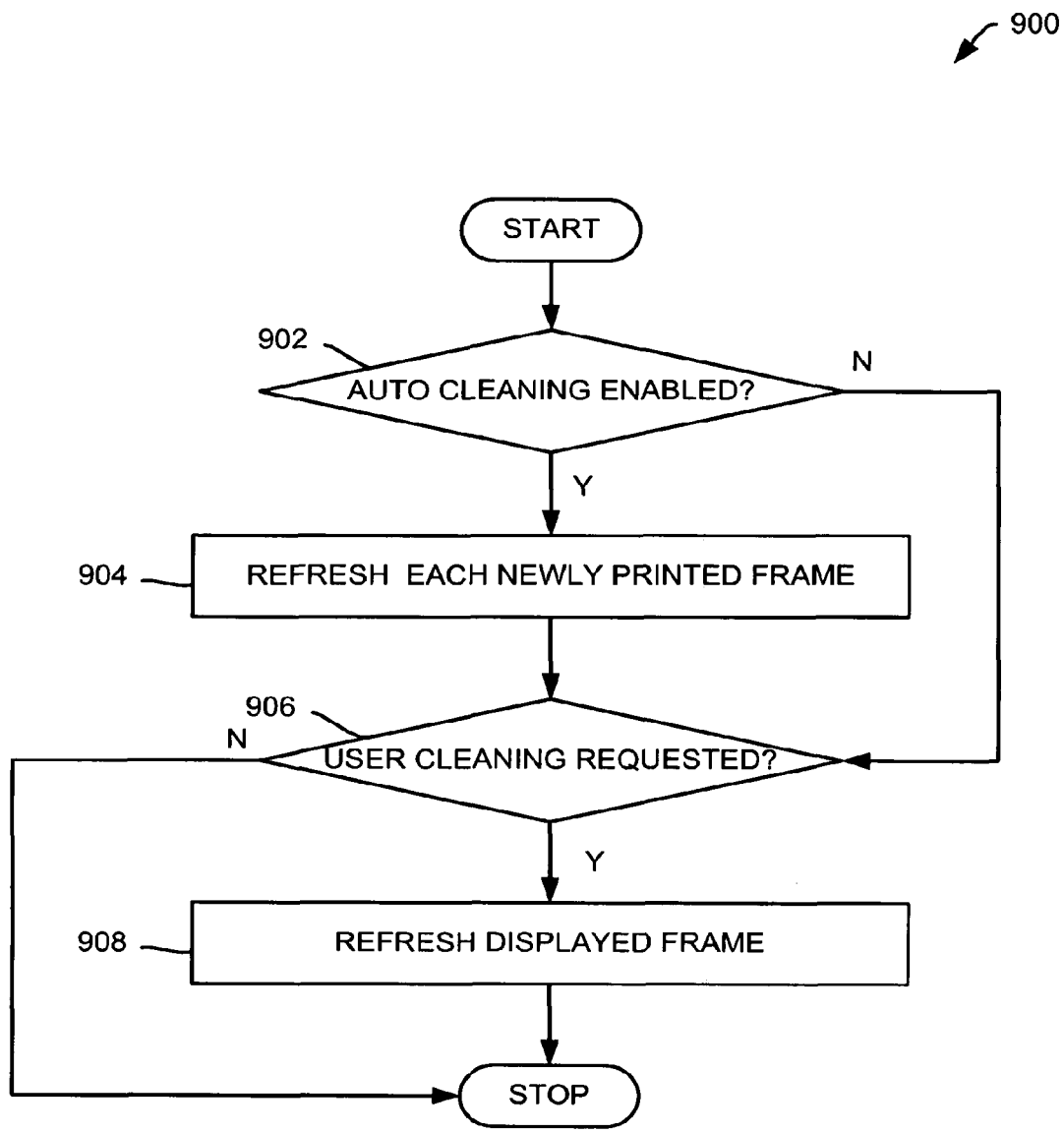
FIG. 9 is an illustrative flowchart for cleaning artifacts on a BILF display in accordance with embodiments of the present invention.

FIG. 9 is an illustrative flowchart 900 for cleaning artifacts on a BILF display in accordance with embodiments of the present invention. At a first step 902, the method determines whether auto cleaning is enabled. If the method determines that auto cleaning is enabled at a step 902, then the method refreshes each newly printed frame. Refreshing a printed frame (i.e. screen), in some embodiments, may be largely transparent to a user. That is, refreshing a screen may not, in some embodiments, clear the screen before an image is refreshed. In that example, a user may experience only a slight distortion in a displayed image on refresh; viewing would otherwise be unaffected. In other embodiments, the screen may be cleared before refresh. The method then continues to a step 906. If the method determines at a step 902 that auto cleaning is not enabled, the method continues to a step 906 to determine whether a user initiated clean is requested. A user may, in some embodiments, request a cleaning where artifacts have resulted in poor readability. Cleaning may be user initiated in any number of manners well-known in the art without departing from the present invention. For example, in an embodiment, a cleaning button embodied in a physical or virtual interface may serve to provide cleaning input. If the method determines at a step 906 that a user clean is requested, then the method refreshes the displayed frame at a step 908 whereupon the method ends. As noted above, refreshing a printed frame, in some embodiments, is largely transparent to a user. That is, refreshing a screen may not, in some embodiments, clear the screen before an image is refreshed. In that example, a user may experience only a slight distortion in a displayed image on refresh; viewing would otherwise be unaffected. In other embodiments, the screen may be cleared before refresh. If the method determines at a step 906 that a user clean is not requested, then the method ends.

Figure 10:
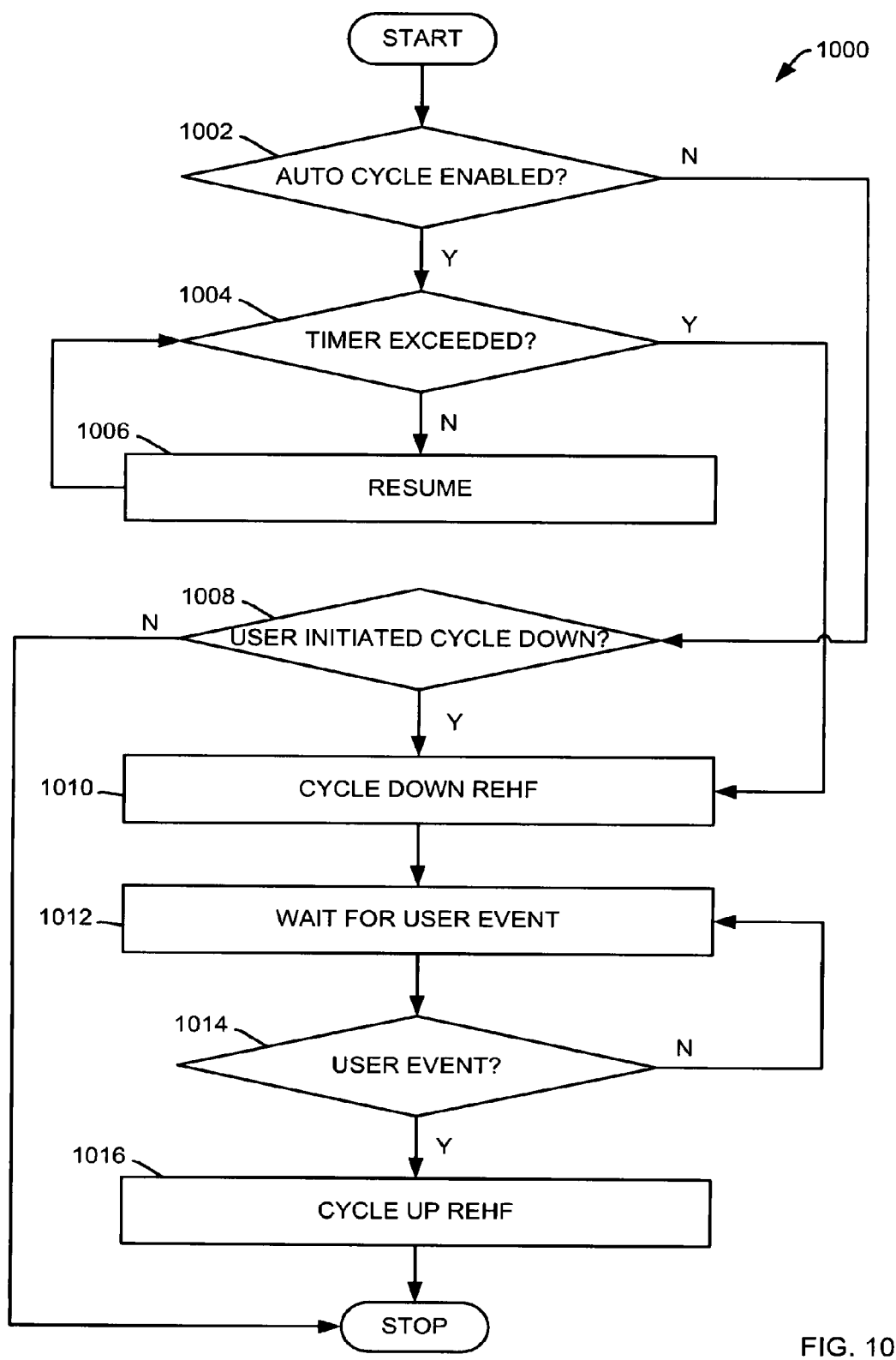
FIG. 10 is an illustrative flowchart for cycling a REHF display being utilized in connection with a BILF display in accordance with embodiments of the present invention.

FIG. 10 is an illustrative flowchart 1000 for cycling a REHF display being utilized in connection with a BILF display in accordance with embodiments of the present invention. Because some BILF displays include some power savings advantages, it may be useful to cycle down (turn off) power hungry REHF displays. As such, cycling an REHF display may be automated or user initiated without departing from the present invention. Thus, at a step 1002, the method determines whether auto cycle is enabled. If the method determines at a step 1002 that auto cycle is enabled, the method then determines whether a timer has been exceeded at a step 1004. In some embodiments, a timer may be set to a range of approximately 1 to 10 seconds. In other embodiments, a timer may be set to more than 10 seconds. If the method determines at a step 1004 that a timer has not been exceeded, then the method continues to a step 1006 to resume whereupon the method continues to a step 1004. If the method determines at a step 1004 that a timer has been exceeded, the method continues to a step 1010 to cycle down an REHF display. If the method determines at a step 1002 that auto cycle is not enabled, the method continues to a step 1008 to determine whether a user initiated cycle down is requested. Cycling down may be user initiated in any number of manners well-known in the art without departing from the present invention. For example, in an embodiment, a cycle down button embodied in a physical or virtual interface may serve to provide cycle down input. If the method determines at a step 1008 that a user initiated cycle down is not requested, the method continues to resume at a step 1006. If the method determines at a step 1008 that a user initiated cycle down is requested, the method continues to a step 1010 to cycle down a REHF display.

Once an REHF display is cycled down, a user may continue to view a complementary BILF display. As noted above, some actions may require application navigation features that are not available to a BILF display. This is particularly true where a BILF display is not in a migrated mode. Migration is discussed in further detail above for FIG. 2. When such an action occurs, then an REHF display may be cycled up. As such, at a step 1012, the method waits for a user event requiring a cycle up of an REHF display. At a step 1014, the method determines whether a user event requiring a cycle up of the REHF display has occurred. If the method determines at a step 1014 that a relevant user event has occurred, the method continues to cycle up an REHF at a step 1016 whereupon the method ends. If the method determines at a step 1014 that a relevant user event has not occurred, the method returns to a step 1012 to wait for a relevant user event.

In some embodiments, wiping a display may be desirable. In examples where sensitive information is being viewed, the ability to quickly wipe a semi-permanent display such as a BILF EPD. Wiping may be user initiated in any number of manners well-known in the art without departing from the present invention. For example, in an embodiment, a wipe button embodied in a physical or virtual interface may serve to provide wipe input. After a wipe, the BILF may be restored from an appropriate buffer.

In some embodiments, and BILF may be utilized to provide status information. Status information typically does not require high frequency refresh rates because the information displayed is read only and does not change at a high rate. Thus, status information may be continuously displayed without unduly burdening power supplies. Thus, status information like: power information, network connection information, signal strength information, user configuration information, display wakefulness information, date information, time information, application information, and system information may be displayed on a BILF in some embodiments.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention. For example, in FIG. 1, steps 112, 114, and 116 are presented in a particular order. However, as may be appreciated, those steps may be performed in any order without departing from the present invention. Indeed, any steps which may be performed in any order are not intended to be limiting with respect to the manner in which they are presented herein. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A product for managing web content navigation on complimentary displays, the complimentary displays including at least a first display device including a first display and a second display device including a second display, the product comprising a non-transitory computer-readable storage medium containing computer program code that comprises:
    a browser navigating mode module that controls operation of both the first display and the second display, the navigating mode module configured to:
    receive a HTML web page;
    translate the HTML web page to a first code stream for display on the first display at a resolution associated with the first display;
    display an image of the HTML web page on the first display based on the first code stream;
    translate the HTML web page to a second code steam that is distinct from the first code stream based on a second resolution associated with the second display, the second resolution distinct from the resolution associated with the first display;
    generate, at the first display device, a first output to the second display device, the first output including information representing at least a portion of a static image of the HTML web page based on the second code stream, the static image of the HTML web page displayed on the second display substantially simultaneously with the display of the HTML web page on the first display;
    receive an input from a user navigating to an intermediate position of the HTML web page displayed on the first display;
    establish an anchor point of the HTML web page corresponding to content at the intermediate position of the HTML web page responsive to the user navigating to the intermediate position; and
    generate, at the first display device, a second output to the second display device, the second output including information representing at least a portion of an updated static image based on the established anchor point, the second display updated to display the content at the intermediate position of the HTML web page on the second display.

2. The product of claim 1, further comprising a reading mode module configured to provide the HTML web page on the second display as selected on the first display, wherein the first display is subsequently turned off during the reading mode.

3. The product of claim 2, wherein the reading mode module further comprises instructions to:
    when an indication is received indicating a user exits the read mode, turn on the first display, and display the web page on the first display.

4. The product of claim 1, wherein receiving the input from the user comprises receiving a navigate function selected from the group consisting of: a scroll and a change of position.

5. The product of claim 1, further comprising an extending mode module configured to provide the static image of the HTML web page comprising a hyperlink on the first display and configured to provide web content linked via the hyperlink which is distinct from the HTML web page on the second display responsive to a selection of the hyperlink displayed on the first display, wherein the first display continues displaying the static image of the HTML web page while the linked web content is displayed on the second display.

6. The product of claim 5, wherein the extending mode module is further configured to provide a progress bar cursor on the first display, wherein the progress bar cursor is selectable to select a position of a document being displayed on the second display, and responsive to a selected position of the document, display the selected position on the second display.

7. The product of claim 1, wherein the first display is selected from the group consisting of: an LCD display, a CRT display, and LED display, a PLED display, an OLED display, a plasma display, and a mirasol display; and wherein the second display is selected from the group consisting of: an electronic paper display (EPD) and a mirasol display.

8. The product of claim 1, wherein the HTML web page includes a format selected from the group consisting of: HTML, XML, XHTML, and SGML.

9. The product of claim 2, wherein the HTML web page is translated utilizing a graphics library selected from the group consisting of: SKIA, Direct3D, Open Graphics Library (OpenGL), OpenGL for embedded systems (ES), MiniGL, Simple DirectMedia Layer, emWin, Cairo (graphics), and Simple and Fast Multimedia Library (SFML).

10. The product of claim 1, wherein the second display device is selected from the group consisting of: a personal digital assistant, a cellular phone, a portable computing device, a computer, a video camera, a digital media player, a digital game player, an electronic textbook, and a GPS device.

11. A method for managing web content using a portable electronic computing device, the portable electronic device having complimentary displays, the complimentary displays including at least a first display device including a first display and a second display device including a second display, the method comprising:
    receiving a HTML web page;
    translating the HTML web page to a first code stream for display on the first display at a resolution associated with the first display;
    displaying an image of the HTML web page on the first display based on the first code stream;
    translating the HTML web page to a second code steam that is distinct from the first code stream based on a second resolution associated with the second display, the second resolution distinct from the resolution associated with the first display;
    generating, at the first display device, a first output to the second display device, the first output including information representing at least a portion of a static image of the HTML web page based on the second code stream, the static image of the HTML web page displayed on the second display substantially simultaneously with the display of the HTML web page on the first display;

receiving an input from a user navigating to an intermediate position of the HTML web page displayed on the first display;

establishing an anchor point of the HTML web page corresponding to content at the intermediate position of the HTML web page responsive to the user navigating to the intermediate position; and generating, at the first display device, a second output to the second display device, the second output including information representing at least a portion of an updated static image based on the established anchor point, the second display updated to display the content at the intermediate position of the HTML web page on the second display.

12. The method of claim 11, further comprising:

entering a reading mode, the reading mode configured for providing the web page on the second display as selected on the first display, wherein the first display is subsequently turned off during the reading mode.

13. The method of claim 12, wherein the reading mode further comprises:

when an indication is received indicating a user exits the read mode, turning on the first display, and displaying the web page.

14. The method of claim 11, wherein receiving the input from the user navigating to the intermediate position comprises receiving a navigate function selected from the group consisting of: a scroll and a change of position.

15. The method of claim 11, further comprising:

entering an extending mode, the extending mode configured for providing the web page comprising a hyperlink on the first display and configured to provide web content linked via the hyperlink which is distinct from the web page on the second display responsive to a selection of the hyperlink displayed on the first display, wherein the first display continues displaying the web page while the linked web content is displayed on the second display.

16. A computing device program product for managing web content using a portable electronic computing device, the portable electronic device having complimentary displays, the complimentary displays including at least a first display and a second display, the computing device program product comprising:

a non-transitory computer readable medium including executable code, the code when executed perform steps comprising;

receiving a HTML web page;

translating the HTML web page to a first code stream for display on the first display at a resolution associated with the first display;

displaying an image of the HTML web page on the first display based on the first code stream;

translating the HTML web page to a second code steam that is distinct from the first code stream based on a second resolution associated with the second display, the second resolution distinct from the resolution associated with the first display;

generating, at the first display device, a first output to the second display device, the first output including information representing at least a portion of a static image of the HTML web page based on the second code stream, the static image of the HTML web page displayed on the second display substantially simultaneously with the display of the HTML web page on the first display;

receiving an input from a user navigating to an intermediate position of the HTML web page displayed on the first display;

establishing an anchor point of the HTML web page corresponding to content at the intermediate position of the HTML web page responsive to the user navigating to the intermediate position; and generating, at the first display device, a second output to the second display device, the second output including information representing at least a portion of an updated static image based on the established anchor point, the second display updated to display the content at the intermediate position of the HTML web page on the second display.

17. The computing device program product of claim 16, wherein the code when executed performs further steps comprising entering a reading mode, the reading mode configured for providing the HTML web page on the second display as selected on the first display, wherein the first display is subsequently turned off during the reading mode.

18. The computing device program product of claim 16, further wherein the code when executed performs further steps comprising providing the HTML web page comprising a hyperlink on the first display and configured to provide web content linked via the hyperlink which is distinct from the HTML web page on the second display responsive to a selection of the hyperlink displayed on the first display, wherein the first display continues displaying the HTML web page while the linked web content is displayed on the second display.

* * * * *